United States Patent
Bakker et al.

(10) Patent No.: US 9,554,300 B2
(45) Date of Patent: Jan. 24, 2017

(54) SYSTEM AND METHOD FOR REPORTING THAT A MAXIMUM NUMBER OF DATA CONTEXTS IS REACHED

(71) Applicant: BlackBerry Limited, Waterloo (CA)

(72) Inventors: Jan Hendrik Lucas Bakker, Irving, TX (US); Bhabani Sankar Panda, Maidenhead (GB); Maiyuran Wijayanathan, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 116 days.

(21) Appl. No.: 13/745,468

(22) Filed: Jan. 18, 2013

(65) Prior Publication Data
US 2014/0204736 A1    Jul. 24, 2014

(51) Int. Cl.
*H04W 28/02* (2009.01)
*H04W 8/22* (2009.01)

(52) U.S. Cl.
CPC ........... *H04W 28/0215* (2013.01); *H04W 8/22* (2013.01)

(58) Field of Classification Search
None
See application file for complete search history.

(56) References Cited

U.S. PATENT DOCUMENTS

| | | |
|---|---|---|
| 2008/0049741 A1 | 2/2008 | Wirtanen et al. |
| 2008/0089303 A1 | 4/2008 | Wirtanen et al. |
| 2008/0089304 A1* | 4/2008 | Wirtanen ............ H04W 28/16 370/342 |
| 2009/0034496 A1 | 2/2009 | Ko et al. |
| 2012/0246325 A1* | 9/2012 | Pancorbo Marcos et al. ............... 709/227 |
| 2012/0317448 A1* | 12/2012 | Li ........................ H04L 41/0686 714/57 |
| 2013/0088956 A1* | 4/2013 | Zhou et al. ................... 370/230 |
| 2014/0198637 A1* | 7/2014 | Shan et al. ................... 370/229 |

FOREIGN PATENT DOCUMENTS

EP    1783961    5/2007

OTHER PUBLICATIONS

Gpp TSG-CT WG1 Meeting #80, "Handling Maximum Number of Active EPS Contexts," C1-123785, Prague, Czech Republic, Oct. 15, 2012, pp. 1-9.*

(Continued)

*Primary Examiner* — Donald Mills
(74) *Attorney, Agent, or Firm* — Fish & Richardson P.C.

(57) ABSTRACT

If a wireless device does not know how many data contexts can be supported, then the wireless device might attempt to establish more data contexts than are supported. Such attempt would normally be rejected. However, the signalling involved in the attempt to establish another data context and the rejection of that attempt is considered wasteful. Embodiments of the present disclosure allow such waste to be reduced or avoided by signalling to the wireless device when the maximum number of data contexts is reached or when it is about to be reached. Such signalling can occur before any attempt to establish more data contexts than are supported. Thus, wasteful signaling involved with attempting to establish more data contexts can be avoided.

43 Claims, 8 Drawing Sheets

(56) References Cited

OTHER PUBLICATIONS

GPP TSG-CT WG1 Meeting #80, "Handling Maximum Number of Active PDP Contexts," C1-123786, Prague, Czech Republic, Oct. 15, 2012, pp. 1-7.*
3GPP TS 24.301 V11.5.0 (Dec. 2012) Technical Specification 3rd Generation Partnership Project; Technical Specification Group Core Network and Terminals; Non-Access-Stratum (NAS) protocol for Evolved Packet System (EPS); Stage 3 (Release 11), 344 pages.
3GPP TS 24.008 V12.0.0 (Dec. 2012) Technical Specification 3rd Generation Partnership Project; Technical Specification Group Core Network and Terminals; Mobile radio interface Layer 3 specification; Core network protocols; Stage 3 (Release 12), 566 pages.
International Search Report and Written Opinion dated Jun. 3, 2014 from corresponding PCT Application No. PCT/EP2014/050883, 15 pages.
3GPP TS 24.301 V11.5.0 (Jan. 1, 2013) Technical Specification, European Telecommunications Standards Institute (ETSI), 3rd Generation Partnership Project; Universal Mobile Telecommunications System (UMTS); LTE; Non-Access-Stratum (NAS) protocol for Evolved Packet System (EPS); Stage 3 (Release 11), 332 pages.

* cited by examiner

SYSTEM AND METHOD FOR REPORTING THAT A MAXIMUM NUMBER OF DATA CONTEXTS IS REACHED

FIELD OF THE DISCLOSURE

This application relates generally to wireless communication, and more particularly to data contexts.

BACKGROUND

A wireless device may communicate with a wireless network using one or more data contexts between the wireless device and a network node. The data contexts can for example include PDP (Packet Data Protocol) contexts or EPS (Evolved Packet System) bearer contexts. There may be many data contexts between the wireless device and the network node. The number of data contexts that can be supported for the wireless device is limited by various factors. Upon an attempt to exceed the limit, such attempt will normally be rejected.

Details of EPS bearer contexts can be found in 3GPP TS 24.301 V11.5.0 (2012-12) Technical Specification 3rd Generation Partnership Project; Technical Specification Group Core Network and Terminals; Non-Access-Stratum (NAS) protocol for Evolved Packet System (EPS); Stage 3 (Release 11), the entire disclosure of which is incorporated herein by reference and hereinafter referred to as "3GPP TS 24.301".

Details of PDP contexts can be found in 3GPP TS 24.008 V12.0.0 (2012-12) Technical Specification 3rd Generation Partnership Project; Technical Specification Group Core Network and Terminals; Mobile radio interface Layer 3 specification; Core network protocols; Stage 3 (Release 12), the entire disclosure of which is incorporated herein by reference and hereinafter referred to as "3GPP TS 24.008".

BRIEF DESCRIPTION OF THE DRAWINGS

Embodiments will now be described with reference to the attached drawings in which.

DETAILED DESCRIPTION OF EMBODIMENTS

Figure 1:
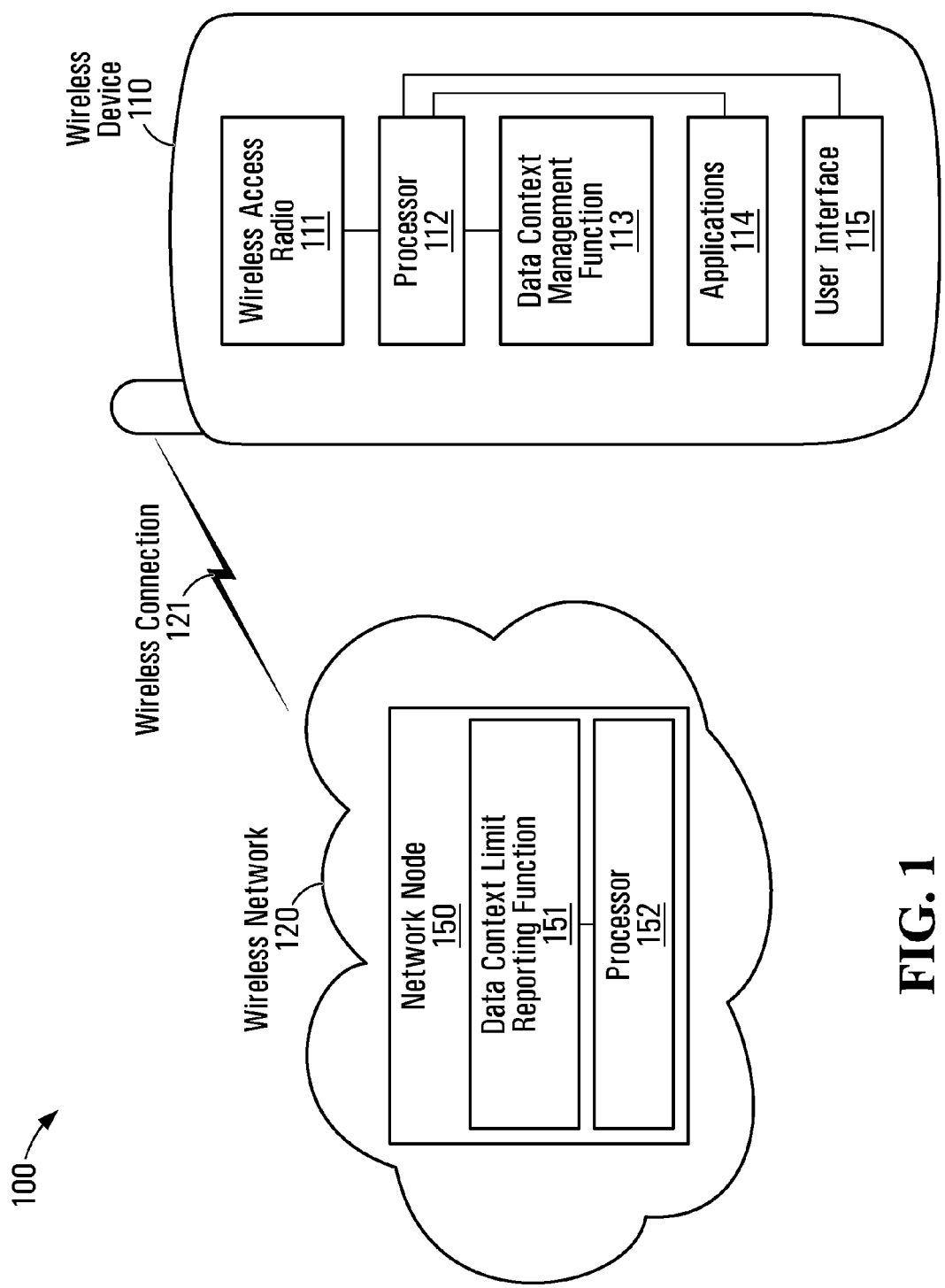
FIG. 1 is a block diagram of an example wireless system.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

According to an embodiment of the present disclosure, there is provided a method by a wireless device, the method comprising: receiving a session management information element coded to indicate that a maximum number of data contexts that can be supported for the wireless device is reached if activating a data context would reach the maximum number of data contexts; after receiving the session management information element, avoiding sending a request for a further data context.

According to an embodiment of the present disclosure, there is provided a non-transitory computer readable medium having stored thereon computer executable instructions that when executed by a processor of a wireless device implement the method summarised above.

According to an embodiment of the present disclosure, there is provided a wireless device comprising: a processor; and a data context management function configured for: receiving a session management information element coded to indicate that a maximum number of data contexts that can be supported for the wireless device is reached if activating a data context would reach the maximum number of data contexts; and after receiving the session management information element, avoiding sending a request for a further data context.

According to an embodiment of the present disclosure, there is provided a method in a wireless network, the method comprising: determining whether establishing a data context for a wireless device would reach a maximum number of data contexts that can be supported for the wireless device; and if establishing a data context for the wireless device would reach the maximum number of data contexts, sending a session management information element coded to indicate that the maximum number of data contexts is reached.

According to an embodiment of the present disclosure, there is provided a non-transitory computer readable medium having stored thereon computer executable instructions that when executed by a processor of a wireless network implement the method summarised above.

According to an embodiment of the present disclosure, there is provided a network node of a wireless network, the network node comprising: a processor; and a data context limit reporting function configured for: determining whether establishing a data context for a wireless device would reach a maximum number of data contexts that can be supported for the wireless device; and if establishing a data context for the wireless device would reach the maximum number of data contexts, sending a session management information element coded to indicate that the maximum number of data contexts is reached.

Other aspects and features of the present disclosure will become apparent, to those ordinarily skilled in the art, upon review of the following description of the specific embodiments of the invention.

Wireless System

Referring first to FIG. 1, shown is a block diagram of an example wireless system 100. The wireless system 100 has a wireless network 120, a wireless device 110 and may have other components that are not shown. The wireless network 120 has network node 150 and may have other components that are not shown. The network node 150 has a data context limit reporting function 151 coupled to a processor 152 and may have other components that are not shown. The wireless device 110 has a processor 112, which is coupled to a wireless access radio 111, a data context management function 113, applications 114, and a user interface 115, and may have other components that are not shown.

The operation of the wireless system 100 will now be described by way of example. The wireless device 110 is adapted to communicate with the wireless network 120 using its wireless access radio 111. Such communication may for example include voice communication, electronic messaging, or any other appropriate form of communication supported by the applications 114. At least some communication with the wireless network 120 is via one or more data contexts between the wireless device 110 and the network node 150. The data contexts can for example include PDP contexts or EPS bearer contexts. There may be many data contexts between the wireless device 110 and the network node 150 depending on the applications 114.

The number of data contexts that can be supported for the wireless device 110 is limited by various factors. For example, different network areas may support a different number of data contexts per wireless device. A PLMN (Public Land Mobile Network), TA (Tracking Area), RA (Routing Area), LA (Location Area) and combinations thereof are examples of network areas. There may be other factors (e.g. operator, system, radio technology, core network node, etc.) that limit the number of data contexts that can be supported for the wireless device 110 as will be described in further detail below.

If a wireless device does not know how many data contexts can be supported, then the wireless device might attempt to establish more data contexts than are supported. Such attempt would normally be rejected. However, the signalling involved in the attempt to establish another data context and the rejection of that attempt is considered wasteful. Embodiments of the present disclosure allow such waste to be reduced or avoided by signalling to the wireless device when the maximum number of data contexts is reached or when it is about to be reached. Such signalling occurs before any attempt to establish more data contexts than are supported. Thus, wasteful signaling involved with attempting to establish more data contexts can be avoided.

According to an embodiment of the present disclosure, the data context limit reporting function 151 of the network node 150 operates to determine whether establishing a data context for the wireless device 100 would reach the maximum number of data contexts that can be supported for the wireless device 110. Furthermore, if establishing a data context for the wireless device 110 would reach the maximum number of data contexts, the data context limit reporting function 151 of the network node 150 operates to send a session management information element coded to indicate that the maximum number of data contexts is reached. According to another embodiment of the present disclosure, the data context management function 113 of the wireless device 110 operates to receive the session management information element if establishing the data context would reach the maximum number of data contexts that can be supported for the wireless device 110, and operates to subsequently avoid sending a request for a further data context.

For example, if the maximum number of data contexts that can be supported for the wireless device 110 is five and the wireless device 110 presently has four data contexts, upon an attempt to establish a fifth data context, the data context limit reporting function 151 of the network node 150 would operate to send a session management information element coded to indicate that the maximum number of data contexts is reached. After receiving the session management information element, the data context management function 113 of the wireless device 110 operates to avoid sending a request for a sixth data context while five data contexts are established. Thus, wasteful signaling involved with attempting to establish a sixth data context when only five data contexts are supported can be avoided.

It is to be understood that the maximum number of data contexts that can be supported for the wireless device 110 might not actually be reached even if the wireless network 120 sends the session management information element coded to indicate that the maximum number of data contexts is reached. The session management information element is sent if establishing a data context would reach the reach the maximum number of data contexts. However, for various reasons, the data context may not actually be established. For example, the session management information element might be sent in a message that does not result in a data context being established. This may be the case if the wireless device 110 rejects a message or subsequent messages related to establishing a data context, or the subsequent messages are subjected to transmission errors, expiring timers, etc. As another example, the session management information element might be sent in a message that modifies an existing data context (i.e. the message does not actually set out to establish another data context).

Therefore, in some implementations, upon receiving a session management information element coded to indicate that the maximum number of data contexts is reached, the sending of a request for a further data context is avoided while the maximum number of data contexts is established. Note that this avoiding may occur well after the session management information element is received. This may be the case if establishment of the data context that reaches the maximum number of data contexts that can be supported for the wireless device 110 occurs well after the session management information element is received. Alternatively, or additionally, the avoiding may occur immediately after the session management information element is received. This may be the case if establishment of the data context that reaches the maximum number of data contexts that can be supported for the wireless device 110 occurs around the same time as when the session management information element is received. Note that depending on the scenario, if the maximum number of data contexts is not actually established, then there may be no reason to avoid the sending of a request for a further data context.

In the illustrated example, the data context limit reporting function 151 and the data context management function 113 are both implemented as software and are each executed on their respective processors 152,112. However, more generally, the data context limit reporting function 151 and the data context management function 113 may each be implemented as software, hardware, firmware, or any appropriate combination thereof. Also note that the network node 150 including the data context limit reporting function 151 may actually involve separate network devices that collectively operate as a "network node". The precise composition of the network node 150 is implementation specific.

There are many possibilities for the wireless network 120. The wireless network 120 would have any appropriate combination of components suitable for a wireless network. The components of the wireless network 120 are implementation specific. Note that the wireless network 120 may include wired components in addition to wireless components. In some implementations, the wireless network 120 includes a CN (Core Network) and a variety of ANs (Access Networks) offering wireless connectivity to wireless devices. The CN and the ANs have network nodes that are communicatively connected. Examples of ANs include E-UTRAN (Evolved Universal Terrestrial Radio Access Network), UTRAN (Universal Terrestrial Radio Access Network), and GERAN (GSM[1] EDGE[2] Radio Access Network). For example, an LTE network can include both an EPC (Evolved Packet Core) and ANs such as E-UTRAN. Also, a GPRS network can include a GRPS core and ANs such as UTRAN and GERAN. Specific example implementations for LTE and GPRS are provided below with reference to FIGS. 4 through 7. However, implementations for any appropriately configured network are possible.

[1] Global System for Mobile Communications.
[2] Enhanced Data rates for GSM Evolution.

There are many possibilities for the wireless device 110. The wireless device 110 can be a mobile device (e.g. handheld computing device, cellular phone, laptop, etc.) or a non-mobile device (e.g. desktop computer, television, enhanced home appliances such as computerized refrigerators and similar devices that have network communications capabilities, etc.). A specific example wireless device is described below with reference to FIG. 8. More generally, the wireless device 110 can be any appropriately configured device suitable for wireless communication.

Wireless Method

Figure 3:
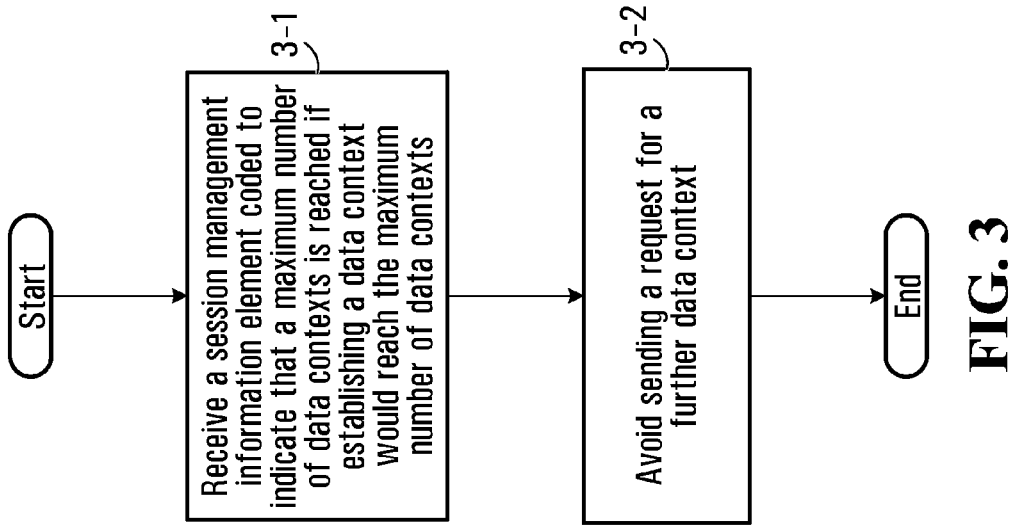
FIG. 3 is a flowchart of a method by a wireless device.
Figure 2:
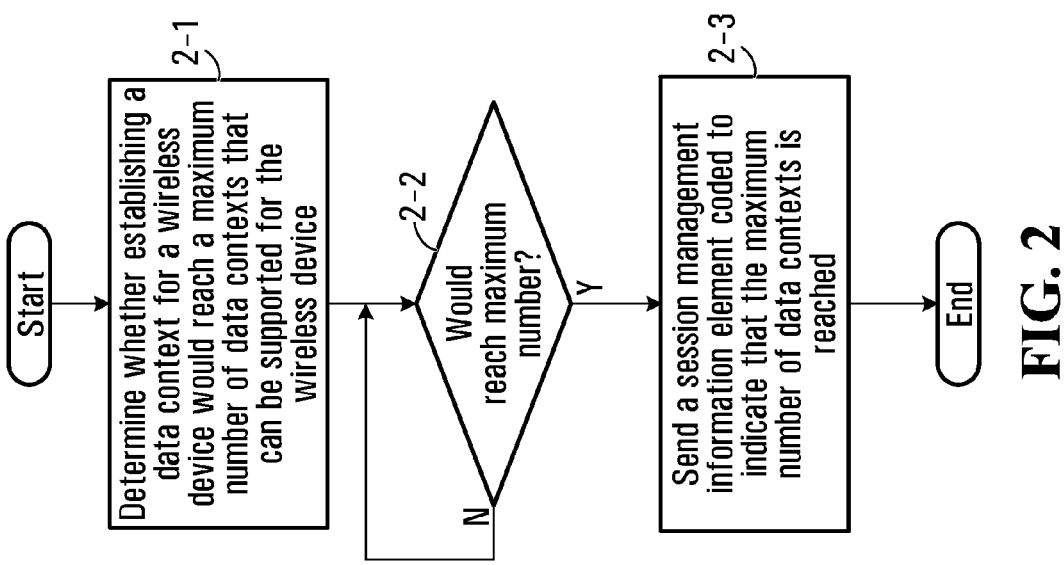
FIG. 2 is a flowchart of a method by a wireless network.

Referring now to FIGS. 2 and 3, shown are flowcharts of a method by a wireless network (FIG. 2) and a method by a wireless device (FIG. 3). The method of FIG. 2 can be executed by a wireless network, for example by the data context reporting function 151 of the wireless network 120 shown in FIG. 1 or by any other appropriately configured wireless network. The method of FIG. 3 can be executed by a wireless device, for example by the data context managing function 113 of the wireless device 110 shown in FIG. 1 or by any other appropriately configured wireless device.

As noted above, if a wireless device does not know how many data contexts can be supported, then the wireless device might attempt to establish more data contexts than are supported. Such attempt would normally be rejected. However, the signalling involved in the attempt to establish another data context and the rejection of that attempt is considered wasteful. Embodiments of the present disclosure allow such waste to be reduced or avoided by signalling to the wireless device when the maximum number of data contexts is reached or when it is about to be reached. Such signalling can occur before any attempt to establish more data contexts than are supported. Thus, wasteful signaling involved with attempting to establish more data contexts can be avoided.

According to an embodiment of the present disclosure, the methods of FIGS. 2 and 3 start with the wireless network determining whether establishing a data context for a wireless device would reach a maximum number of data contexts that can be supported for the wireless device as indicated at step 2-1. Furthermore, if establishing a data context for the wireless device would reach the maximum number of data contexts as indicated at step 2-2, the wireless network sends a session management information element coded to indicate that the maximum number of data contexts is reached as indicated at step 2-3.

According to another embodiment of the present disclosure, the wireless device receives the session management information element if establishing the data context would reach the maximum number of data contexts that can be supported for the wireless device as indicated at step 3-1, and subsequently avoids sending a request for a further data context as indicated at step 3-2. In some implementations, as similarly noted above for FIG. 1, the avoiding is performed while the maximum number of data contexts is established. Thus, wasteful signaling involved with attempting to establish additional data contexts can be avoided.

In some implementations, the session management information element includes a cause code. The cause code serves to inform the wireless device for which the data context is being established that establishment of the data context will reach the maximum number of data contexts that can be supported. In some implementations, the session management information element can be set to be indicative of the fact that the maximum number of data contexts that can be supported for a wireless device in a network area is reached or is about to be reached. More generally, the session management information element can include any appropriate coding from which the wireless device can determine that the maximum number of data contexts is reached or may be reached upon establishment of a data context.

There are many ways in which the wireless network can determine whether establishing a data context for a wireless device would reach a maximum number of data contexts that can be supported for the wireless device. In some implementations, the wireless network determines, based on how many data contexts are established for the wireless device, whether establishing one more data context would reach the maximum number of data contexts that can be supported for the wireless device. For example, if the wireless network knows that up to five data contexts can be supported for the wireless device and the wireless device presently has four data contexts, then the wireless network determines that establishing a data context for the wireless device reaches the maximum number of data contexts.

In some specific implementations, the wireless network determines whether only one communication identifier is available for the wireless device. Thus, one data context can be established with the remaining communication identifier. For example, if the wireless network knows that up to five communication identifiers can be used for five data contexts and the wireless device presently has four data contexts (each identified uniquely by a communication identifier), then the wireless network determines that establishing a data context for the wireless device reaches the maximum number of data contexts since there is only communication identifier available for the data context to be established. The communication identifier is implementation-specific and might for example be an EPS bearer identity, or an NSAPI (Network Service Access Point Identifier). Specific implementation examples are provided below with reference to FIGS. 6A through 6D.

In some specific implementations, the wireless network also determines whether the maximum number of data contexts for the wireless device is less than a maximum number of communication identifiers that are allowed by a protocol used between the wireless device and the wireless network. This determination may be performed so that the session management information element is sent only when the maximum number of data contexts for the wireless device (e.g. five data contexts) is less than the maximum number of communication identifiers (e.g. eleven communication identifiers) that are supported by the protocol. Note that if the maximum number of data contexts for the wireless device is equal to the maximum number of communication identifiers (e.g. eleven), then there may be no need to send the session management information element to the wireless device because the wireless device may already be aware of the maximum number of communication identifiers and will not try to establish another data context when there are no communication identifiers remaining. The maximum number of data contexts for the wireless device is implementation-specific and might for example be a PLMN's maximum number of EPS bearer contexts in S1 mode configured at an MME for the wireless device, or a PLMN's maximum number of PDP contexts configured at an SGSN for the wireless device. Specific implementation examples are provided below with reference to FIGS. 6A through 6D.

As noted above, different network areas may support a different number of data contexts per wireless device. However, network area is not the only factor that can limit the maximum number of data contexts that can be supported for a wireless device. In a specific example, the limit on the number of data contexts that can be established for the wireless device might depend on one or more of:

1. The operator whose services the wireless device is using (i.e. operator deployment decision). For example, the operator may have different PLMNs and the maximum is different in different PLMNs. An operator may arrive at operating a wireless network divided in different network areas identified by PLMN identifiers due to overtime merging with other operators that already identify their wireless network with a PLMN identifier. Overtime, an operator can accumulate many PLMN identifiers that can be considered equivalent (i.e. a wireless device will be using the operator's services in network areas identified by PLMN identifiers that are different from other PLMN identifiers also administered by the same operator). However, different maxima may exist in each network area identified by a PLMN identifier of that operator).
2. The wireless communication system (e.g. the protocol used in the system has a limit such as 11 data contexts, whereby any 3GPP (3rd Generation Partnership Project) core network conforms to its specified limit. For example:
   a. the limit for the EPS or EPC is the maximum number of EPS bearer identities supported by the protocol applicable in EPS or EPC (as specified in 3GPP TS 24.007, sub-clause 11.2.3.1.5); and
   b. the limit for the GPRS core or 3G-PS is the maximum number of NSAPIs supported by the protocol applicable in GPRS core or 3G-PS (as specified 3GPP TS 24.008, sub-clause 10.5.6.2).
3. The radio technology (network node vendor implementation decision or operator deployment decision).
4. The core network technology or the core network nodes (network node vendor implementation decision or operator deployment decision).

In some implementations, the maximum number of data contexts that can be supported for the wireless device in the network area is applicable in at least one of A/Gb mode, Iu mode, and S1 mode. In some implementations, the network has different such maxima in each of the modes and again in each of the PLMNs.

In some implementations, the session management information element is sent during a session management procedure for establishing a data context that would arrive at the maximum number of data contexts. Note that the session management procedure can be initiated by either the wireless device or the wireless network. When the session management procedure is initiated by the wireless device, the session management information element might be sent in a message that accepts a previous request from the wireless device to activate the data context. When the session management procedure is initiated by the wireless network, the session management information element might be sent in a message that requests activation of the data context. In some implementations, the session management information element is received in a message that modifies an existing data context. The precise messaging is implementation-specific and may be dependent on the wireless network (e.g. LTE vs. GPRS).

As a specific example for LTE (e.g. E-UTRAN supporting EPC), the session management information element is sent in any of (1) an activate default EPS bearer context request message, (2) an activate dedicated EPS bearer context request message, and (3) a modify EPS bearer context request message. As a specific example for GPRS (e.g. UTRAN or GERAN supporting a GPRS core), the session management information element is sent in any of (1) an activate PDP context accept message, (2) a request PDP context activation message, (3) an activate secondary PDP context accept message, (4) a request secondary PDP context activation message, and (5) a modify PDP context accept message. Details of such messaging for LTE and GPRS will be provided below with reference to FIGS. 4 through 7.

After receiving the session management information element, the wireless device avoids sending a request for a further data context while the maximum number of data contexts is established. However, if an existing data context is deactivated, the wireless device may send a request for a further data context if the maximum number of data contexts is not established. In the event that the wireless device is a mobile device, then the mobile device may avoid sending a request for a further data context while the maximum number of data contexts is established in its network area. However, in some implementations, upon moving to a second network area, the mobile device halts the avoiding of sending a request for a further data context (i.e. the mobile device is permitted to request a further data context). This is because the second network area may allow more data contexts than the first network area. However, if the mobile device receives another session management information element coded to indicate that the maximum number of data contexts is reached, then the mobile device avoids sending a request for a further data context while the maximum number of data contexts is established in the second network area.

In some implementations, after receiving a session management information element coded to indicate that the maximum number of data contexts is reached, the wireless device determines the maximum number of data contexts based on a number of data contexts that the wireless device has. In some implementations, the wireless device makes this determination upon receiving the session management information element and does not wait until establishment of the data context that would reach the maximum number of data contexts. Thus, the wireless device might for example determine the maximum number of data contexts as being one plus the number of data contexts that the wireless device has (i.e. adding one to account for the data context that has yet to be established). Note that such determination does not rely on the data context being established, which can be useful because in some circumstances "the data context that has yet to be established" may fail to be established. In alternative implementations, the wireless device waits until establishment of the data context that would reach the maximum number of data contexts. Thus, the wireless device might for example determine the maximum number of data contexts as being the number of data contexts that the wireless device has.

In some implementations, sending the session management information element coded to indicate that the maximum number of data contexts is conditional on one or more additional factors (i.e. it may not be sent even if establishing a data context for the wireless device would reach the maximum number of data contexts). For example, the session management information element might be sent only if when it does not override an existing session management information element being sent. The existing session management information element might pertain to other information being conveyed to the wireless device such restrictions to IP version for example. Specific examples of this are described in further detail below with reference to FIGS. 4 through 7. In other implementations, such restrictions to IP version for example are sent in parallel with sending the session management information element coded to indicate that the maximum number of data contexts is reached.

Computer Readable Medium

In accordance with another embodiment of the disclosure, there is provided a non-transitory computer readable medium having computer executable instructions stored thereon for execution on a processor so as to implement any of the methods described herein. The non-transitory computer readable medium might for example be an optical disk such as a CD (Compact Disk), a DVD (Digital Video Disk), or a BD (Blu-Ray Disk). Alternatively, the non-transitory computer readable medium might for example be a memory stick, a memory card, a disk drive, a solid state drive, etc. Other non-transitory computer readable media are possible and are within the scope of this disclosure. More generally, the non-transitory computer readable medium can be any tangible medium in which the computer executable instructions can be stored.

LTE and GPRS Introduction

Example details of LTE and GPRS implementations will be described in this section with reference to FIG. 4. It is to be understood that these details are very specific and are provided only as examples.

A wireless device's ESM (EPS Session Management) sublayer or SM (Session Management) sublayer can request connectivity with a PDN (Packet Data Network). The ESM sublayer is making use of services provided by the EPS. The SM sublayer is making use of services provided by the GPRS. Depending on the sublayer involved, this connectivity is provided by a PDN Connection or a PDP context. The internet is an example of a PDN. An example of another PDN is a PDN that offers IM (IP Multimedia) CN subsystem IMS (Subsystem IP Multimedia Subsystem) services. An example of yet another PDN is a PDN that offers emergency bearer services or emergency services. Other PDNs may also exist.

A wireless device may have multiple PDN connections. A wireless device may have multiple PDN Connections to the same PDN or to different PDNs. A PDN Connection "bundles" one or more EPS bearer contexts. A PDN Connection must have one default EPS bearer (context) and may have zero or more dedicated EPS bearer (context)s.

A wireless device may have multiple PDP contexts. A PDP Context is either a primary PDP context or a secondary PDP context. A secondary PDP context must be associated with one primary PDP contexts. The connection represented by a primary PDP context can be considered a PDN connection, i.e. the connection can offer connectivity to a PDN.

Generally, when a connectivity is established by GPRS and subsequently "seamlessly" offered by EPS (or vice versa), then a secondary PDP context maps to a dedicated EPS bearer (context), a primary PDP context maps to a default EPS bearer (context).

Example details of PDN connections are provided in 3GPP TS 24.301 under section 6.1.1 as reproduced below. For the purposes of this document, a UE (User Equipment) is considered to be an example of a wireless device.

The main function of the ESM sublayer is to support the EPS bearer context handling in the UE and in the MME.

The ESM comprises procedures for:
the activation, deactivation and modification of EPS bearer contexts; and
the request for resources (IP connectivity to a PDN or dedicated bearer resources) by the UE.

Each EPS bearer context represents an EPS bearer between the UE and a PDN. EPS bearer contexts can remain activated even if the radio and S1 bearers constituting the corresponding EPS bearers between UE and MME are temporarily released.

An EPS bearer context can be either a default bearer context or a dedicated bearer context.

A default EPS bearer context is activated when the UE requests a connection to a PDN.

Generally, ESM procedures can be performed only if an EMM context has been established between the UE and the MME, and the secure exchange of NAS messages has been initiated by the MME by use of the EMM procedures. The first default EPS bearer context, however, is activated during the EPS attach procedure. Once the UE is successfully attached, the UE can request the MME to set up connections to additional PDNs. For each additional connection, the MME will activate a separate default EPS bearer context. A default EPS bearer context remains activated throughout the lifetime of the connection to the PDN.

A dedicated EPS bearer context is always linked to a default EPS bearer context and represents additional EPS bearer resources between the UE and the PDN. The network can initiate the activation of dedicated EPS bearer contexts together with the activation of the default EPS bearer context or at any time later, as long as the default EPS bearer context remains activated.

Default and dedicated EPS bearer contexts can be modified. Dedicated EPS bearer contexts can be released without affecting the default EPS bearer context. When the default EPS bearer context is released, then all dedicated EPS bearer contexts linked to it are released, too.

The UE can request the network to allocate, modify or release additional EPS bearer resources. The network decides whether to fulfil a request for additional resources by activating a new dedicated EPS bearer context or modifying an existing dedicated or default EPS bearer context.

Example details of PDP Contexts are provided in 3GPP TS 24.008 under section 6.1.3.1 as reproduced below. For the purposes of this document, an MS (Mobile Station) is considered an example of a wireless device.

The PDP Context Activation procedure is used to activate the default PDP context for a given PDP address and APN, i.e. a PDN connection, whereas all additional contexts associated to the same PDP address and APN are activated with the secondary PDP context activation procedure. An MS supporting S1 mode shall keep the default PDP context activated during the lifetime of the PDN connection. An MS not supporting S1 mode should apply the same behaviour (see 3GPP TS 23.060). When more than one PDP context is associated to a PDP address, there shall be a Traffic Flow Template (TFT), including one or more packet filters, for each or all but one context.

Different operators of networks enable different limits on the number of contexts that can be established between a wireless device and a network node e.g. core network element such as but not limited to an MME (Mobility Management Entity) or an SGSN (Serving General Packet Radio Service Support Node). Examples of contexts are PDP contexts and EPS bearer contexts. EPS bearer contexts are also known as EPS bearers. An EPS bearer can be a dedicated bearer or default bearer. A dedicated bearer is associated with one default bearer. PDP contexts can be primary PDP contexts or secondary PDP contexts. A secondary PDP context is associated with one primary PDP context.

Some operators may further require a different limit for data contexts supporting a QoS suitable for media. A typical example of a data context supporting a QoS suitable for media is a dedicated bearer (aka a dedicated EPS bearer context) or a secondary PDP context). A dedicated bearer or a secondary PDP context can also be used for SIP signalling (for example, depending on the QCI used or the PCO (Protocol Configuration Options) exchanged during context creation). An operator may wish to have a different limit for two kinds of contexts, e.g. for PDP context type there are contexts of the primary PDP context kind and secondary PDP context kind. For example, the limit for primary PDP contexts may be two and the limit for secondary PDP context may be one. For EPS bearer context type there are contexts of the default EPS bearer context kind and dedicated EPS bearer context kind.

A wireless device may be operable using networks belonging to different operators. In fact, operators may operate different networks themselves e.g. networks using different radio technology or core network equipment. Examples of different core network equipment are MME and SGSN. In fact even an SGSN or MME developed by a first vendor is different from an SGSN or MME developed by a second vendor. Further, E-UTRA (also referred to as LTE) is an example of a radio technology that is different from the UTRA or GERA(N) radio technology. Such radio technology or core network technology serves a "network area". A PLMN value optionally along with one of a Tracking Area value, Routing Area value or Location Area value can be used to identify uniquely a "network area". Network areas usually consist of one to many cells. A network or wireless device using GERAN, UTRAN, E-UTRAN respectively is said to be operating in A/Gb, Iu, S1 mode respectively.

If a wireless device attempts to establish or activate a data context while it already has the maximum number of contexts activated for the operator, system, radio technology, or core network node, then the response received by the wireless device may be a rejection. The messages representing the attempt transmitted by the wireless device and the rejection transmitted by the wireless network are considered unnecessary messages. These unnecessary messages can needlessly increase the load for network equipment, occupy resources in the radio network and negatively impact the wireless device's battery. These messages, and the processing and transmission they require, use resources.

According to one approach for avoiding these messages, the maximum number of data contexts can be stored on a network area identifier basis using provisioning mechanisms. However, this would involve all wireless devices to be re-provisioned when the maximum changes thereby leading to a significant network signalling load. Also, in a visited network, the visiting operator typically cannot provision the "maximum". Therefore, when a network that is a visited network changes the maximum, also all wireless devices using (partner or any other) networks may need to re-provision the updated maximum in their wireless devices. Each time, a network establishes (partnership or roaming or other) agreements, all wireless devices may need to be updated.

According to an embodiment of the disclosure, a mobile device can determine a maximum number of data contexts that can be supported for the mobile device by detecting an indication that the maximum number of data contexts is reached. Such indication may be received in a response message from a wireless network during establishment of an $N^{th}$ data context or an attempt thereof, where is N is equal to the maximum number of data contexts that can be supported for the mobile device. Generally, the detected indication at the mobile device is received from the network when the network has M spare data contexts for the wireless device in the network area (where M is typically 1 when the indication is received). The wireless device can then determine the maximum number of data contexts (N) as M plus the number of presently active data contexts. As previously discussed, in some scenarios, after detecting the indication, the wireless device may not actually reach the maximum number of data contexts (N).

In another example, if the wireless network accepts a request for the $N^{th}$ data context and responds with a message indicating acceptance of the request, the wireless network includes in that message an indication that the maximum number of contexts is reached. In some implementations, the indication is not included in the message if the message already indicates other information that has precedence over the indication that the maximum number of contexts is reached. Specific example of this are provided below with reference to FIGS. 6A through 6D.

Figure 4:
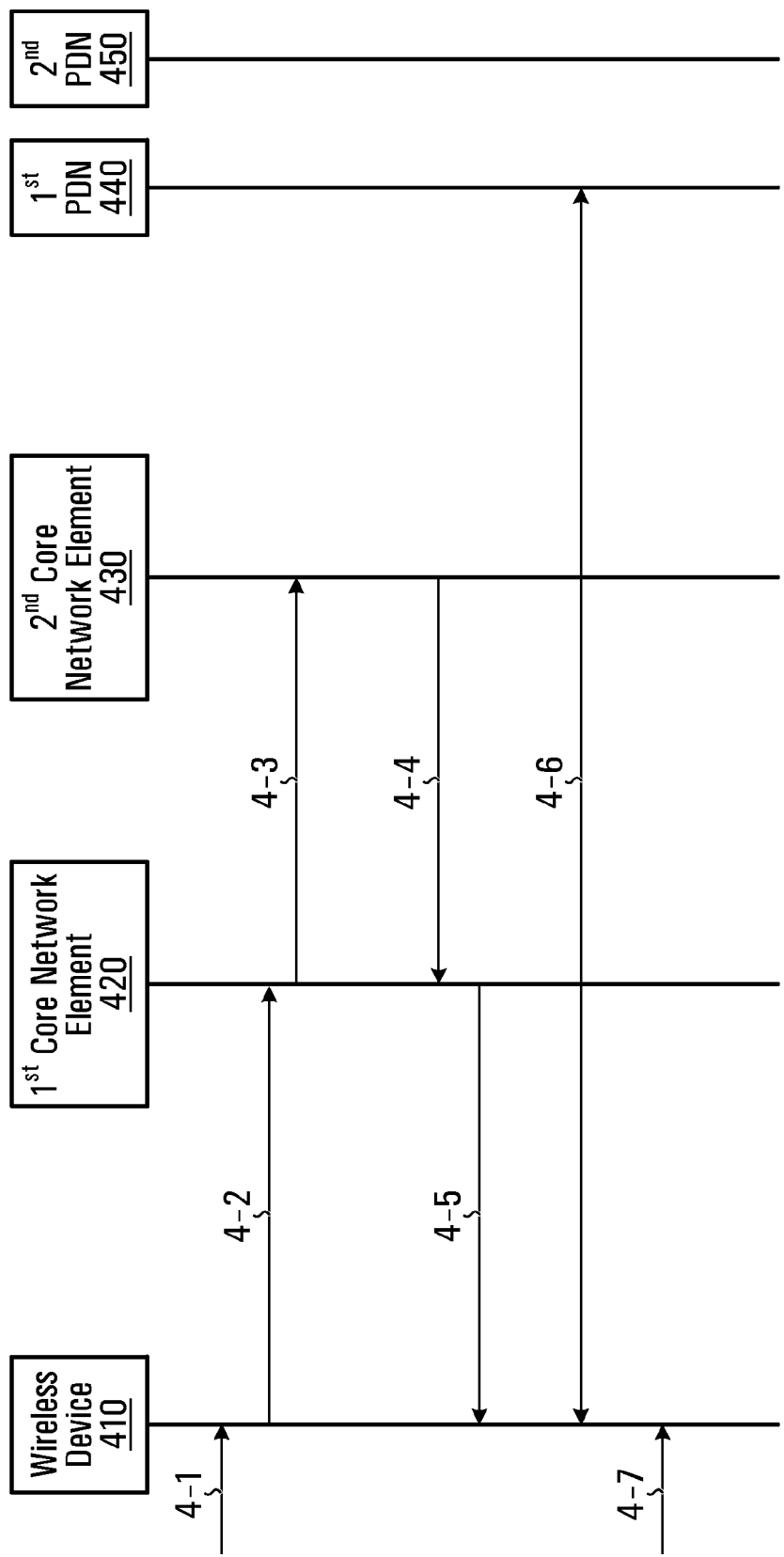
FIG. 4 is a signalling diagram for a wireless system.

Referring now to FIG. 4, shown is a signalling diagram for a wireless system. The wireless system can be an LTE-based system (e.g. E-UTRAN supporting EPC) or a GPRS-based system (e.g. UTRAN or GERAN supporting a GPRS core). The signalling diagram shows various signalling involving a wireless device 410, core network elements 420,430 of a wireless network, and PDNs 440,450. There may be additional signalling and other components that are not shown.

If at step 4-1 the wireless device 410 determines that it needs connectivity, then at step 4-2 the wireless device 410 may send a request-type message for requesting activation or establishment of a data context. Examples of the request-type message include PDN CONNECTIVITY REQUEST message, BEARER RESOURCE ALLOCATION REQUEST message, and ACTIVATE PDP CONTEXT REQUEST message. In response, at step 4-3 the first core network element 420 requests connectivity with the second core network element 430. It should be noted that in the case of a network initiated context activation procedure, steps 4-1, 4-2 and 4-3 do not occur. Example signalling for the case of a network initiated context is provided below with reference to FIGS. 6A and 6B.

If the request for activating or establishing a data context can be granted (e.g. taking into account subscription information, etc.), then the second core network element 430 reserves an IP address and reports the same to the first core network element 420 in a response at step 4-4. The IP address is forwarded to the wireless device 410 at step 4-5 in a response-type message that responds to the request-type message and indicates acceptance of the request. Examples of the response-type message include ACTIVATE DEFAULT EPS BEARER CONTEXT REQUEST message, ACTIVATE DEDICATED EPS BEARER CONTEXT REQUEST, MODIFY EPS BEARER CONTEXT REQUEST message, and ACTIVATE PDP CONTEXT ACCEPT message.

If establishing the data context would reach the maximum number of contexts that can be supported for the wireless device 410, the response-type message also indicates that the maximum number of contexts is reached. Additionally, or alternatively, the second message can include an identification of the maximum number of contexts that can be supported (e.g. the identification has a value of five if the maximum number of contexts that can be supported for the wireless device 410 in its network or network area is five).

In some implementations, the wireless device 410 determines the maximum number of data contexts allowed or permitted for the wireless device 410 as one plus the number of data contexts it has active. For such implementations, the wireless device 410 does not wait until establishment of the data context that reaches the maximum number of data contexts. Instead, the wireless device 410 adds one to the number of data contexts it has active to account for the data context that has yet to be established. Note that such determination does not rely on the data context being established, which can be useful because in some circumstances "the data context that has yet to be established" may fail to be established. In other implementations, the wireless device 410 determines the maximum number of data contexts allowed/permitted for the wireless device 410 as the number of data contexts it has active. For such implementations, the wireless device 410 may wait until establishment of the data context that reaches the maximum number of data contexts.

In some implementations, consideration is given to concurrent (E)SM (ESM or SM) procedures or other events that change the number of data contexts that are active at the wireless device 410 while the wireless device 410 is determining the maximum number of data contexts it has active. In the event of concurrent (E)SM procedures, messages may be received in a different order than the order in which they are transmitted. Thus, in some implementations, the wireless device 410 determines the maximum number of contexts it has active as the number of data contexts it has active upon completion of any concurrent (E)SM procedures when at least one of the concurrent (E)SM procedure receives the message indicating that the maximum number of contexts is reached.

Optionally, the wireless device 410 determines the maximum number of contexts it has active as the number of contexts it has active after a predefined period of time (e.g. short period of time) from completion of any concurrent (E)SM procedures that are occurring when at least one of the concurrent (E)SM procedure receives the message indicating the that the maximum number of contexts is reached. This would cover the case where the network may have initiated a procedure resulting in deactivating a context, but the first message indicated this deactivation arrives at the wireless device 410 shortly after completion of the concurrent (E)SM procedures.

At step 4-6, there is an optional exchange of user plane data between the wireless device 410 and the first PDN 440 subsequent to activating or establishing the data context. The user plane data uses the activated or established data context. The user plane data may be any sort of data based on various applications running on the wireless device 410. The user plane data is transmitted between first PDN 440 and wireless device 410.

If at step 4-7 the wireless device 410 determines that it needs additional connectivity for example with the first PDN 440 or with the second PDN 450 (e.g. an upper layer of the wireless device 410 requests data context activation), then the wireless device 410 refrains from sending another request-type message. This is because the wireless device 410 has received the response-type message indicating that the maximum number of data contexts is reached, or has determined the maximum number of contexts supported and the wireless device 410 is currently using the maximum number of contexts. The indication that the maximum number of contexts is reached may also include a field set to a value such that the value represents the maximum number of contexts.

In some implementations, after the wireless device 410 receives the message of acceptance at step 4-5 and the message includes an indication that the maximum number of contexts is reached, then the wireless device 410 does not send a request to activate or establish another context unless the wireless device 410 has less contexts active than the maximum number of contexts. Note that by detecting an indication that the maximum number of contexts is reached in a response to the message from the network upon or during successful establishment the Nth context, where N is equal to the maximum number of contexts, the wireless device 410 and the network use less signalling. Signalling that will fail can be prevented thereby saving on network, RAN and wireless device resources.

In some embodiments, when the wireless device 410 determines as a result of receiving the response message that the maximum number of data contexts is reached, the wireless device 410 may also set/start a timer. The wireless device 410 would then not request, activate or establish a context for as long as the timer is running or while the maximum number of contexts is active, unless the context to be requested is a request for an emergency context. The timer can be set with a local value (where the local value is implementation specific and could have been stored at the wireless device 410) or a value received from the network (e.g. the value may be received in the same response message).

In some implementations, the determined maximum number of contexts is in effect within a network area in which the wireless device 410 has received the message indicating acceptance of the request. For example, the wireless device 410 could consult the determined maximum number of contexts prior to requesting another context while the wireless device is in is the same network area as when it received the message indicating acceptance of the request. The wireless device could store the determined maximum number of contexts. Upon moving to another network area, the wireless device would no longer need to consult the determined maximum number of contexts for the previous area.

In some implementations, the indication that the maximum number of contexts is reached is any of the following:
an indication that the maximum number of EPS bearer contexts is reached;
an indication that the maximum number of default EPS bearer contexts is reached;
an indication that the maximum number of dedicated EPS bearer contexts is reached;
an indication that the maximum number of dedicated EPS bearer contexts pertaining to a particular default EPS bearer is reached;
an indication that the maximum number of PDP contexts is reached
an indication that the maximum number of primary PDP contexts is reached;

an indication that the maximum number of secondary PDP contexts is reached;

an indication that the maximum number of secondary PDP contexts pertaining to a particular primary PDP context is reached.

The indication that the maximum number of contexts is reached can be a session management information element or an extended session management information element. Alternatively, the indication that the maximum number of contexts is reached can be a value of a session management information element or a value of an extended session management information element.

Example LTE Implementation Details

Figure 5:
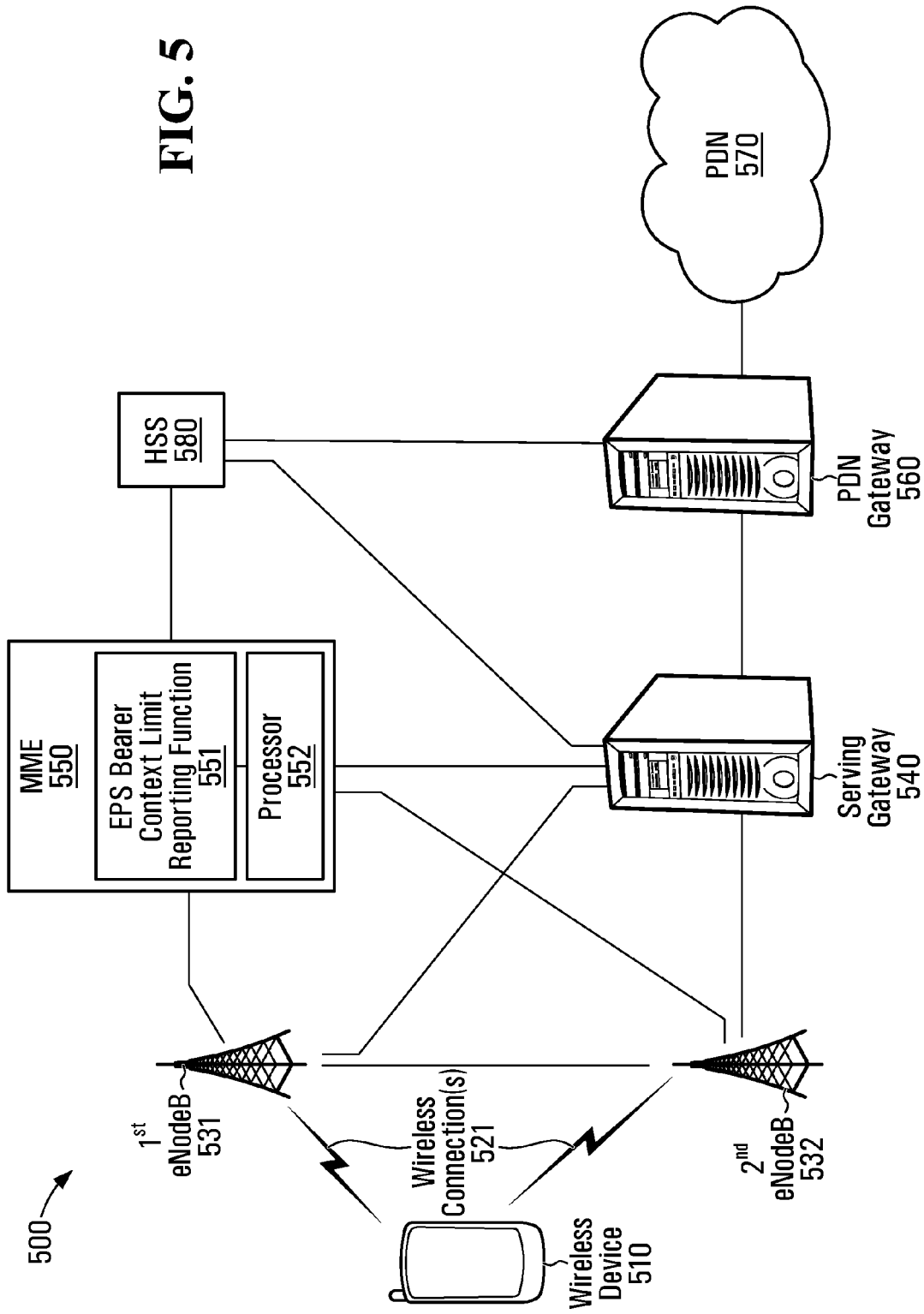
FIG. 5 is a block diagram of an example LTE (Long-Term Evolution) network.

Referring now to FIG. 5, shown is a block diagram of an example LTE network 500. The LTE network 500 has a radio access network having a first eNodeB (E-UTRAN Node B) 531, a second eNodeB 532, and may have other eNodeBs that are not shown.

In the illustrated example, each eNodeB 531,532 is coupled to an MME 550 and a serving gateway 540, which in turn is coupled to a PDN gateway 560, which in turn is coupled to a PDN 570, which might for example be an Internet. The MME 550, the serving gateway 540, and the PDN gateway are coupled to an HSS (Home Subscriber Server) 580. The MME 550 has an EPS bearer context limit reporting function 551 coupled to a processor 552 and may have other components, but they are not shown for simplicity.

The wireless system has a wireless device 510 and may have other wireless devices that are not shown. While details of the wireless device 510 are not shown, the wireless device 510 can be configured in a similar manner as the wireless device 110 shown in FIG. 1.

In operation, the wireless device 510 is adapted to communicate with the LTE network 500. Such communication may for example be voice communication, electronic messaging, or any other appropriate form of communication. At least some communication with the LTE network 500 is over one or more EPS bearer contexts between the wireless device 510 and the PDN gateway 560. There may be many EPS bearer contexts between the wireless device 510 and the MME 550.

The number of EPS bearer contexts that can be supported for the wireless device 510 is limited by various factors. For example, network areas may support a different number of EPS bearer contexts per wireless device. In the illustrated example, the EPS bearer contexts limit reporting function 551 of the MME 550 operates to determine the maximum number of EPS bearer contexts that can be supported for the wireless device 510. This might for example involve determining a limit on how many EPS bearer contexts per wireless device can be supported in the network area in which the wireless device 510 resides.

If a wireless device does not know how many EPS bearer contexts can be supported, then the wireless device might attempt to establish more EPS bearer contexts than are supported. Such attempt would normally be rejected. However, the signalling involved in the attempt to establish another EPS bearer context and the rejection of that attempt is considered wasteful. Embodiments of the present disclosure allow such waste to be reduced or avoided by signalling to the wireless device when the maximum number of EPS bearer contexts is reached or when it is about to be reached. Such signalling occurs before any attempt to establish more EPS bearer contexts than are supported. Thus, wasteful signaling involved with attempting to establish more EPS bearer contexts can be avoided.

According to an embodiment of the present disclosure, if establishing an EPS bearer context for the wireless device 510 would reach the maximum number of EPS bearer contexts, the EPS bearer context limit reporting function 551 of the MME 550 operates to send a session management information element coded to indicate that the maximum number of EPS bearer contexts is reached. According to another embodiment of the present disclosure, the wireless device 510 operates to receive the session management information element if establishing the EPS bearer context would reach the maximum number of EPS bearer contexts that can be supported for the wireless device 510, and subsequently avoids sending a request for a further EPS bearer context while the maximum number of EPS bearer contexts is established.

There are many possibilities for the EPS bearer context limit reporting function 551 of the LTE network 500. In the illustrated example, the EPS bearer context limit reporting function 551 is implemented as software and is executed by the processor 552. However, more generally, the EPS bearer context limit reporting function 551 may be implemented as software, hardware, firmware, or any appropriate combination thereof. In the illustrated example, the EPS bearer context limit reporting function 551 is shown as a single component of the MME 550. However, more generally, the EPS bearer context limit reporting function 551 may be implemented as one or more components and may be implemented as part of, or separate from, the MME 550. The one or more components may be distributed throughout the LTE network 500, or reside in a common location. Other implementations are possible.

Further example LTE implementation details will now be provided with reference to FIGS. 6A through 6D, which are signalling diagrams for the wireless device 510 and the LTE network 500. It is to be understood that the details provided in this section are very specific and are provided only as examples. By way of overview, details are provided for network initiated ESM procedures, followed by details for wireless device requested ESM procedures.

Network Initiated ESM Procedures

Network initiated ESM procedures are described in 3GPP TS 24.301 under section 6.4. This includes details of a default EPS bearer context activation procedure under section 6.4.1, and details of a dedicated EPS bearer context activation procedure under section 6.4.2.

An excerpt from section 6.4.1 of 3GPP TS 24.301 concerning the default EPS bearer context activation procedure is reproduced below.

6.4.1 Default EPS Bearer Context Activation Procedure 6.4.1.1 General

The purpose of the default bearer context activation procedure is to establish a default EPS bearer context between the UE and the EPC. The default EPS bearer context activation procedure is initiated by the network as a response to the PDN CONNECTIVITY REQUEST message from the wireless device. The default bearer context activation procedure can be part of the attach procedure, and if the attach procedure fails, the wireless device shall consider that the default bearer activation has implicitly failed. [ . . . ]

6.4.1.2 Default EPS Bearer Context Activation Initiated by the Network

The MME shall initiate the default bearer context activation procedure by sending an ACTIVATE DEFAULT EPS BEARER CONTEXT REQUEST message and enter the state BEARER CONTEXT ACTIVE PENDING (see example in figure 6.4.1.2.1). [ . . . ]

The MME shall assign and include an EPS bearer identity in the ACTIVATE DEFAULT EPS BEARER CONTEXT REQUEST message. [ . . . ]

Figure 6A:
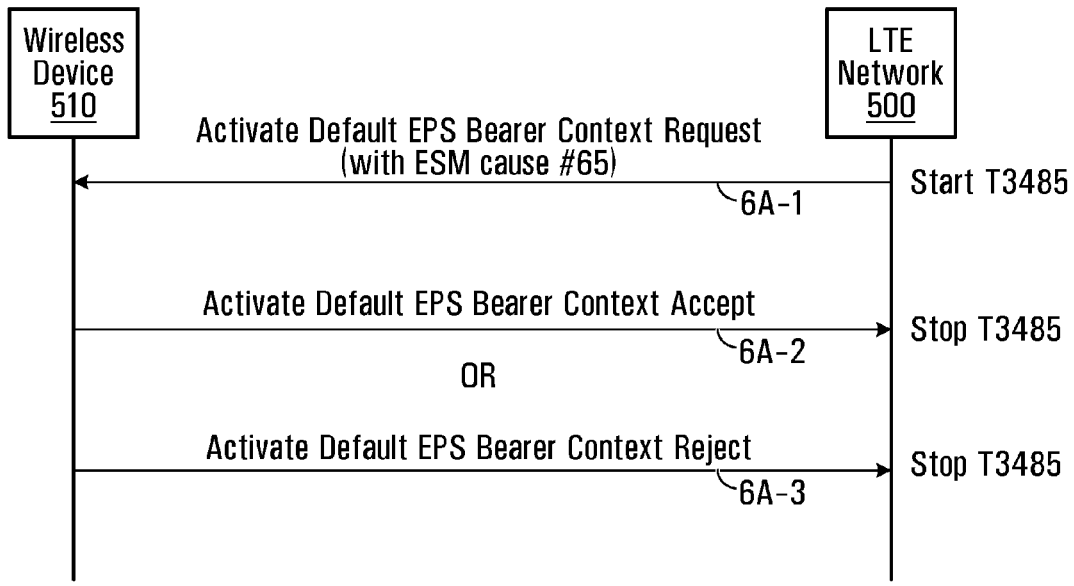
FIGS. 6A through 6D are signalling diagrams for a wireless device and the LTE network.

In accordance with an implementation of the present disclosure, if only one EPS bearer identity is available for the wireless device 510 and PLMN's maximum number of EPS bearer contexts in S1 mode configured at the MME 550 for the wireless device 510 is less than the maximum number of EPS bearer identities allowed by the protocol, then the MME 550 shall include ESM cause #65 "maximum number of EPS bearers reached" in the ACTIVATE DEFAULT EPS BEARER CONTEXT REQUEST message. With reference to FIG. 6A, the LTE network 500 sends the ACTIVATE DEFAULT EPS BEARER CONTEXT REQUEST message to the wireless device 510 at step 6A-1.

Furthermore, when the wireless device 510 receives the ACTIVATE DEFAULT EPS BEARER CONTEXT REQUEST message, if the message includes ESM cause value is #65 "maximum number of EPS bearers reached", the wireless device 510 shall determine the PLMN's maximum number of active bearers in S1 mode as one plus the number of active EPS bearer contexts it has. The PLMN's maximum number in S1 mode applies to the PLMN in which the ESM cause #65 "maximum number of EPS bearers reached" is received. Note that in some situations, when attempting to establish multiple EPS bearer contexts, the number of active EPS bearer contexts that the wireless device 510 has when cause #65 is received is not equal to the maximum number of EPS bearer contexts reached in the LTE network 500.

With reference to FIG. 6A, the wireless device 510 may subsequently accept the default EPS bearer context activation by sending an ACTIVATE DEFAULT EPS BEARER CONTEXT ACCEPT message at step 6A-2, or reject the default EPS bearer context activation by sending an ACTIVATE DEFAULT EPS BEARER CONTEXT REJECT message at step 6A-3.

An excerpt from section 6.4.2 of 3GPP TS 24.301 concerning the dedicated EPS bearer context activation procedure is reproduced below.

6.4.2 Dedicated EPS Bearer Context Activation Procedure 6.4.2.1 General

The purpose of the dedicated EPS bearer context activation procedure is to establish an EPS bearer context with specific QoS and TFT between the UE and the EPC. The dedicated EPS bearer context activation procedure is initiated by the network, but may be requested by the UE by means of the UE requested bearer resource allocation procedure (see subclause 6.5.3) or the UE requested bearer resource modification procedure (see subclause 6.5.4). The dedicated bearer context activation procedure can be part of the attach procedure or be initiated together with the default EPS bearer context activation procedure when the UE initiated stand-alone PDN connectivity procedure. If the attach procedure or the default EPS bearer context activation procedure fails, the UE shall consider that the dedicated bearer activation has implicitly failed. The network may initiate the dedicated EPS bearer context activation procedure together with the completion of the service request procedure.

6.4.2.2 Dedicated EPS Bearer Context Activation Initiated by the Network

The MME shall initiate the dedicated bearer context activation procedure by sending an ACTIVATE DEDICATED EPS BEARER CONTEXT REQUEST message, start the timer T3485, and enter the state BEARER CONTEXT ACTIVE PENDING (see example in figure 6.4.2.2.1).

The MME allocates the EPS bearer identity and includes it in the ACTIVATE DEDICATED EPS BEARER CONTEXT REQUEST message. The MME shall include the EPS bearer identity of the associated default bearer as the linked EPS bearer identity in the ACTIVATE DEDICATED EPS BEARER CONTEXT REQUEST message. [ . . . ].

Figure 6B:
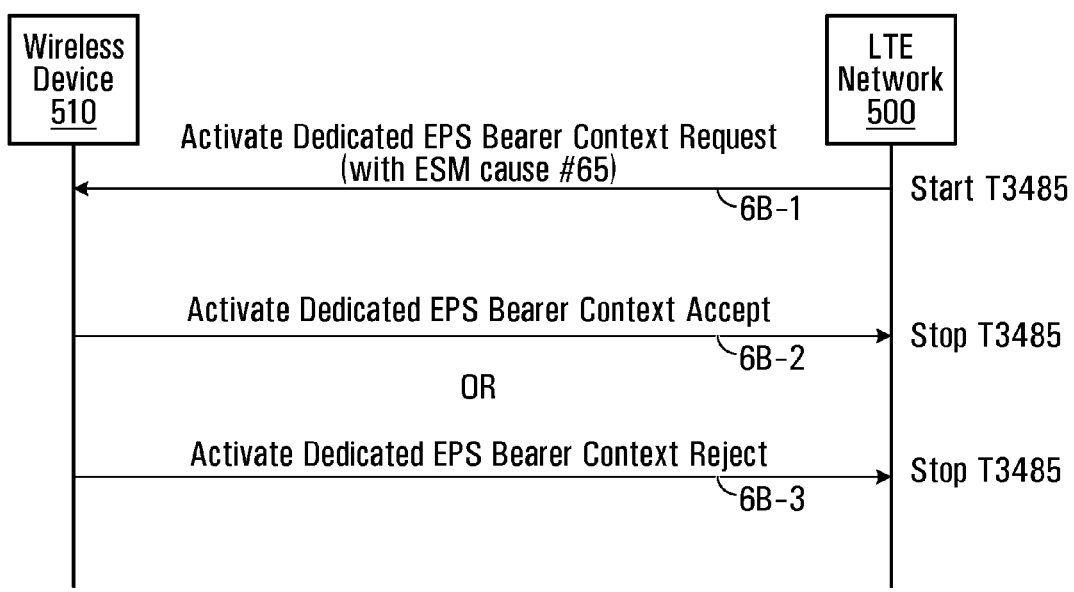

In accordance with an implementation of the present disclosure, if only one EPS bearer identity is available for the wireless device 510 and PLMN's maximum number of EPS bearer contexts in S1 mode configured at the MME 550 for the wireless device 510 is less than the maximum number of EPS bearer identities allowed by the protocol, then the MME 550 shall include ESM cause #65 "maximum number of EPS bearers reached" in the ACTIVATE DEDICATED EPS BEARER CONTEXT REQUEST message. With reference to FIG. 6B, the LTE network 500 sends the ACTIVATE DEDICATED EPS BEARER CONTEXT REQUEST message to the wireless device 510 at step 6B-1.

Furthermore, when the wireless device 510 receives the ACTIVATE DEDICATED EPS BEARER CONTEXT REQUEST message, if the message includes ESM cause value is #65 "maximum number of EPS bearers reached", the wireless device 510 shall determine the PLMN's maximum number of active bearers in S1 mode as one plus the number of active EPS bearer contexts it has. The PLMN's maximum number in S1 mode applies to the PLMN in which the ESM cause #65 "maximum number of EPS bearers reached" is received. Note that in some situations, when attempting to establish multiple EPS bearer contexts, the number of active EPS bearer contexts that the wireless device 510 has when cause #65 is received is not equal to the maximum number of EPS bearer contexts reached in the LTE network 500.

With reference to FIG. 6B, the wireless device 510 may subsequently accept the default EPS bearer context activation by sending an ACTIVATE DEDICATED EPS BEARER CONTEXT ACCEPT message as shown at step 6B-1, or reject the default EPS bearer context activation by sending an ACTIVATE DEDICATED EPS BEARER CONTEXT REJECT message as shown at step 6B-3.

Wireless Device Requested ESM Procedures

Wireless device requested ESM procedures are described in 3GPP TS 24.301 under section 6.5. An excerpt from section 6.5 is reproduced below.

6.5 UE Requested ESM Procedures 6.5.0 General

The maximum number of active EPS bearer contexts is determined by whichever is the lowest of the 3GPP system's maximum number (specified in 3GPP TS 24.007[12]), the PLMN's maximum number in S1 mode, or the UE's maximum number.

NOTE: Subclauses 6.5.1.4 and 6.5.3.4 specify that the UE determines the PLMN's maximum number in S1 mode when it receives ESM cause #65 "maximum number of EPS bearers reached".

6.5.1.2 UE Requested PDN Connectivity Procedure Initiation

When the PDN CONNECTIVITY REQUEST message is sent together with an ATTACH REQUEST message, the UE shall not include the APN.

[ . . . ]

The UE shall set the request type to "initial request" when the UE is establishing a new PDN connectivity to a PDN in an attach procedure or in a stand-alone PDN connectivity procedure. The UE shall set the request type to "emergency" when the UE is requesting a new PDN connectivity for emergency bearer services. The UE shall set the request type to "handover" when the connectivity to a PDN is established upon handover from a non-3GPP access network and the UE was connected to that PDN before the handover to the 3GPP access network.

[ . . . ]

6.5.1.3 UE Requested PDN Connectivity Procedure Accepted by the Network

[ . . . ]

If connectivity with the requested PDN is accepted, but with a restriction of IP version (i.e. both an IPv4 address and an IPv6 prefix is requested, but only one particular IP version, or only single IP version bearers are supported/allowed by the network), ESM cause #50 "PDN type IPv4 only allowed", #51 "PDN type IPv6 only allowed", or #52 "single address bearers only allowed", respectively, shall be included in the ACTIVATE DEFAULT EPS BEARER CONTEXT REQUEST message.

Figure 6C:
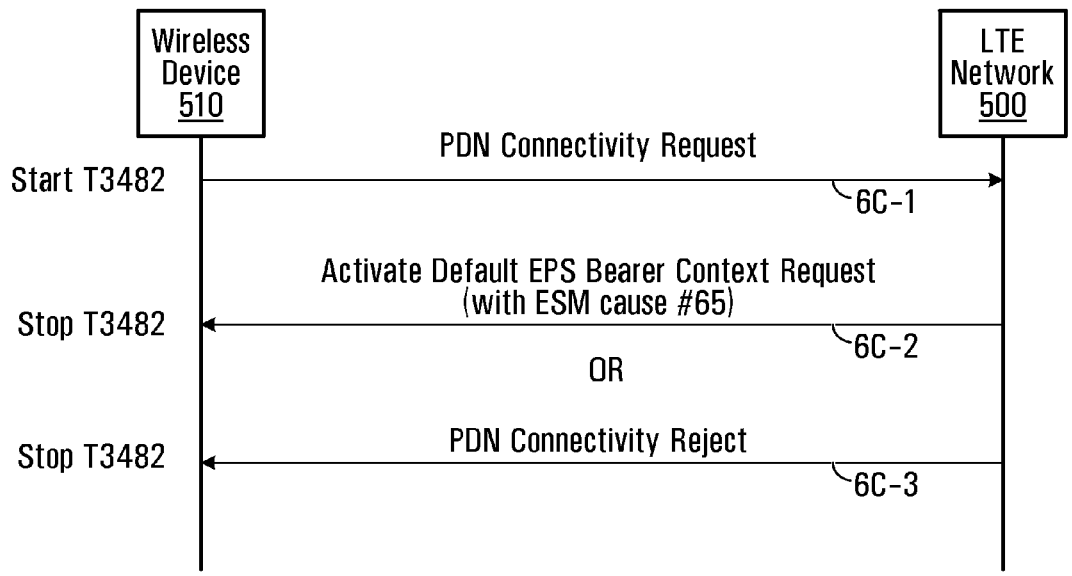

In accordance with an implementation of the present disclosure, if connectivity with the requested PDN is accepted, but the wireless device 510 has reached the PLMN's maximum number of active bearers in S1 mode, and if the ESM cause is not yet included in the ACTIVATE DEFAULT EPS BEARER CONTEXT REQUEST message, then the MME 550 shall include ESM cause #65 "maximum number of EPS bearers reached" in the ACTIVATE DEFAULT EPS BEARER CONTEXT REQUEST message. With reference to FIG. 6C, the LTE network 500 responds to the PDN CONNECTIVITY REQUEST message sent at step 6C-1 with the ACTIVATE DEFAULT EPS BEARER CONTEXT REQUEST message at step 6C-2. Note that the ESM cause can e.g. be set to ESM cause #50 "PDN type IPv4 only allowed", #51 "PDN type IPv6 only allowed", or #52 "single address bearers only allowed". The MME 550 does not override an already set ESM cause with #65 "maximum number of EPS bearers reached".

In accordance with another implementation of the present disclosure, if connectivity with the requested PDN is accepted, but the wireless device 510 has reached the PLMN's maximum number of active bearers in S1 mode, and if the ESM cause is not set to #50, #51 or #52 in the ACTIVATE DEFAULT EPS BEARER CONTEXT REQUEST message, then the MME 550 shall include ESM cause #65 "maximum number of EPS bearers reached" in the ACTIVATE DEFAULT EPS BEARER CONTEXT REQUEST message. Note that the ESM cause can e.g. be set to ESM cause #50 "PDN type IPv4 only allowed", #51 "PDN type IPv6 only allowed", or #52 "single address bearers only allowed". The MME 550 does not override an already set ESM cause with #65 "maximum number of EPS bearers reached".

In accordance with another implementation of the present disclosure, if connectivity with the requested PDN is accepted without a restriction of IP version, but the wireless device 510 has reached the PLMN's maximum number of active bearers in S1 mode, then the MME 550 shall include ESM cause #65 "maximum number of EPS bearers reached" in the ACTIVATE DEFAULT EPS BEARER CONTEXT REQUEST message.

In accordance with another implementation of the present disclosure, if connectivity with the requested PDN is accepted without a restriction of IP version, but only one EPS bearer identity is available for the wireless device 510 and the PLMN's maximum number of EPS bearer contexts in S1 mode configured at the MME 550 for the wireless device 510 is less than the maximum number of EPS bearer identities allowed by the protocol, then the MME 550 shall include ESM cause #65 "maximum number of EPS bearers reached" in the ACTIVATE DEFAULT EPS BEARER CONTEXT REQUEST message.

In accordance with some implementations of the present disclosure, the LTE network 500 shall include the ESM cause if the LTE network 500 allocated a PDN address of a PDN type which is different from the PDN type requested by the wireless device 510, or the wireless device 510 has reached the PLMN's maximum number of active bearers in S1 mode.

In accordance with some implementations of the present disclosure, if the wireless device 510 receives a message with ESM cause value is #65 "maximum number of EPS bearers reached", the wireless device 510 shall determine the PLMN's maximum number of active bearers in S1 mode as one plus the number of active EPS bearer contexts it has. The PLMN's maximum number in S1 mode applies to the PLMN in which the ESM cause #65 "maximum number of EPS bearers reached" is received. Note that in some situations, when attempting to establish multiple EPS bearer contexts, the number of active EPS bearer contexts that the wireless device 510 has when cause #65 is received is not equal to the maximum number of EPS bearer contexts reached in the LTE network 500.

The example shown at steps 6C-1 and 6C-2 handle a situation in which connectivity with the requested PDN is accepted. However, if connectivity with the requested PDN is not accepted, then the LTE network 500 sends a PDN CONNECTIVITY REJECT message to the wireless device 510 at step 6C-3.

An excerpt from section 6.5 of 3GPP TS 24.301 concerning handling the maximum number of active EPS bearer contexts is reproduced below.

6.5.1.4A Handling the Maximum Number of Active EPS Bearer Contexts

If the maximum number of active EPS bearer contexts is reached at the UE (see subclause 6.5.0) and the upper layers of the UE request connectivity to a PDN the UE shall not send a PDN CONNECTIVITY REQUEST message unless an active EPS bearer is deactivated. If the UE de-activates an active EPS bearer context, choosing which EPS bearer context to de-activate is implementation specific, however the UE shall not deactivate an EPS bearer context for emergency.

NOTE: Subclause 6.5.1.6 specifies that a PDN CONNECTIVITY REQUEST message with the same combination of APN and PDN type as an already existing, non-emergency PDN connection can be acceptable, in some cases. In these cases the UE does not need to de-activate an active EPS bearer context if the maximum number of active EPS bearer contexts is reached at the UE.

If the UE de-activates an EPS bearer context in order to request an emergency EPS bearer context, it may either de-activate an EPS bearer context locally or via explicit signalling. If the UE performs local de-activation, the UE shall perform tracking area updating procedure to indicate EPS bearer context status to the network.

An excerpt from section 6.5 of 3GPP TS 24.301 concerning a wireless device requested bearer resource allocation procedure is reproduced below.

6.5.3.2 UE Requested Bearer Resource Allocation Procedure Initiation

In order to request the allocation of bearer resources for one traffic flow aggregate, the UE shall send a BEARER RESOURCE ALLOCATION REQUEST message to the MME, start timer T3480 and enter the state PROCEDURE TRANSACTION PENDING (see example in figure 6.5.3.2.1).

Figure 6D:
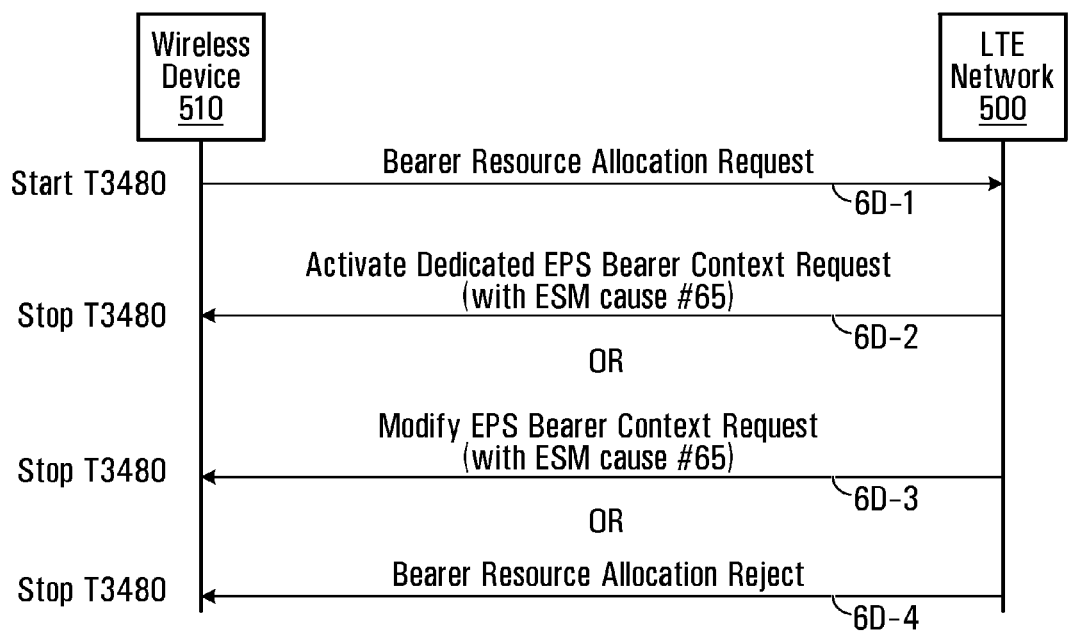

With reference to FIG. 6D, the wireless device 510 sends the BEARER RESOURCE ALLOCATION REQUEST message to the LTE network 500 at step 6D-1. In accordance with an implementation of the present disclosure, if the bearer resource allocation requested is accepted by the LTE network 500, the MME 550 shall initiate either a dedicated EPS bearer context activation procedure at step 6D-2 or an EPS bearer context modification procedure at step 6D-3. If only one EPS bearer identity is available for the wireless device 510 and the PLMN's maximum number of EPS bearer contexts in S1 mode configured at the MME 550 for the wireless device 510 is less than the maximum number of EPS bearer identities allowed by the protocol, the MME 550 shall include ESM cause #65 "maximum number of EPS bearers reached" in the ACTIVATE DEDICATED EPS BEARER CONTEXT REQUEST or MODIFY EPS BEARER CONTEXT REQUEST message. Note that there may not be other values defined for the ESM cause IE. However, other values for the ESM cause can be defined. In some implementations, the MME 550 does not override an already set ESM cause with #65 "maximum number of EPS bearers reached".

If the wireless device 510 receives a message with ESM cause value is #65 "maximum number of EPS bearers reached", the wireless device 510 shall determine the PLMN's maximum number in S1 mode as one plus the number of active EPS bearer contexts it has. The PLMN's maximum number in S1 mode applies to the PLMN in which the ESM cause #65 "maximum number of EPS bearers reached" is received.

As similarly noted above for FIG. 1, the maximum number of data contexts that can be supported for the wireless device 510 might not actually be reached even if the LTE network 500 sends the session management information element coded to indicate that the maximum number of data contexts is reached. The MODIFY EPS BEARER CONTEXT REQUEST message at step 6D-3 is an example of a message that does not cause a new data context to be established. Rather, this message may cause an existing data context to be modified and therefore the maximum number of data contexts may not be reached as a result of this message. At any rate, the wireless device 510 may determine the maximum number of data contexts in a network area and avoid requesting further data contexts while the maximum number of data contexts is established in the network area.

The examples shown at steps 6D-1 through 6D-3 handle a situation in which connectivity with the requested PDN is accepted at least in part. However, if connectivity with the requested PDN is not accepted, then the LTE network 500 sends a BEARER RESOURCE ALLOCATION REJECT message to the wireless device 510 at step 6D-4.

An excerpt from section 6.5 of 3GPP TS 24.301 concerning handling the maximum number of active EPS bearer contexts is reproduced below.

6.5.3.4A Handling the Maximum Number of Active EPS Bearer Contexts

If the UE requests allocation of additional bearer resources, and the network has reached its maximum number of active EPS bearer contexts, then the network can:

reject the request if the network decides that it is necessary to allocate a dedicated EPS bearer context; or accept the request by sending a MODIFY EPS BEARER CONTEXT REQUEST message.

NOTE: An example of where the network will reject the request for allocation of additional bearer resources is when the request includes a GBR requirement while all existing bearers are non-GBR bearers, and the maximum number of active EPS bearer contexts has been reached at the network.

If the maximum number of active EPS bearer contexts is reached at the UE (see subclause 6.5.0) and the UE de-activates an active EPS bearer context prior to sending the request for additional bearer resources, then choosing which EPS bearer context to de-activate is implementation specific, however the UE shall not deactivate a default EPS bearer context for emergency.

The Activate dedicated EPS bearer context request message at step 6D-2 is sent by the LTE network 500 to the wireless device 510 to request activation of a dedicated EPS bearer context associated with the same PDN address(es) and APN as an already active default EPS bearer context. In some implementations, the Activate dedicated EPS bearer context request message has contents as shown in Table 1 below.

TABLE 1

ACTIVATE DEDICATED EPS BEARER CONTEXT REQUEST message content

| IEI | Information Element | Type/Reference | Presence | Format | Length |
|---|---|---|---|---|---|
| | Protocol discriminator | Protocol discriminator 9.2 | M | V | ½ |
| | EPS bearer identity | EPS bearer identity 9.3.2 | M | V | ½ |
| | Procedure transaction identity | Procedure transaction identity 9.4 | M | V | 1 |
| | Activate dedicated EPS bearer context request message identity | Message type 9.8 | M | V | 1 |
| | Linked EPS bearer identity | Linked EPS bearer identity 9.9.4.6 | M | V | ½ |

TABLE 1-continued

ACTIVATE DEDICATED EPS BEARER CONTEXT REQUEST message content

| IEI | Information Element | Type/Reference | Presence | Format | Length |
|---|---|---|---|---|---|
|  | Spare half octet | Spare half octet 9.9.2.9 | M | V | ½ |
|  | EPS QoS | EPS quality of service 9.9.4.3 | M | LV | 2-14 |
|  | TFT | Traffic flow template 9.9.4.16 | M | LV | 2-256 |
| 5D | Transaction identifier | Transaction identifier 9.9.4.17 | O | TLV | 3-4 |
| 30 | Negotiated QoS | Quality of service 9.9.4.12 | O | TLV | 14-22 |
| 32 | Negotiated LLC SAPI | LLC service access point identifier 9.9.4.7 | O | TV | 2 |
| 8- | Radio priority | Radio priority 9.9.4.13 | O | TV | 1 |
| 34 | Packet flow Identifier | Packet flow Identifier 9.9.4.8 | O | TLV | 3 |
| 27 | Protocol configuration options | Protocol configuration options 9.9.4.11 | O | TLV | 3-253 |
|  | ESM cause | ESM cause 9.9.4.4 | O | V | 1 or 2 |

Note that the ACTIVATE DEDICATED EPS BEARER CONTEXT REQUEST message includes an ESM cause as an IE (information element). In some implementations, the LTE network 500 shall include this IE, if the wireless device 510 has reached the PLMN's maximum number of active bearers in S1 mode. The purpose of the ESM cause information element is to indicate the reason why a session management request is rejected or, if the request is accepted, to indicate a limitation.

The Modify EPS bearer context request message at step 6D-3 is sent by the LTE network 500 to the wireless device 510 to request modification of an active EPS bearer context. In some implementations, the Modify EPS bearer context request message has contents as shown in Table 2 below.

TABLE 2

MODIFY EPS BEARER CONTEXT REQUEST message content

| IEI | Information Element | Type/Reference | Presence | Format | Length |
|---|---|---|---|---|---|
|  | Protocol discriminator | Protocol discriminator 9.2 | M | V | ½ |
|  | EPS bearer identity | EPS bearer identity 9.3.2 | M | V | ½ |
|  | Procedure transaction identity | Procedure transaction identity 9.4 | M | V | 1 |
|  | Modify EPS bearer context request message identity | Message type 9.8 | M | V | 1 |
| 5B | New EPS QoS | EPS quality of service 9.9.4.3 | O | TLV | 3-15 |
| 36 | TFT | Traffic flow template 9.9.4.16 | O | TLV | 3-257 |
| 30 | New QoS | Quality of service 9.9.4.12 | O | TLV | 14-22 |
| 32 | Negotiated LLC SAPI | LLC service access point identifier 9.9.4.7 | O | TV | 2 |
| 8- | Radio priority | Radio priority 9.9.4.13 | O | TV | 1 |
| 34 | Packet flow Identifier | Packet flow Identifier 9.9.4.8 | O | TLV | 3 |
| 5E | APN-AMBR | APN aggregate maximum bit rate 9.9.4.2 | O | TLV | 4-8 |
| 27 | Protocol configuration options | Protocol configuration options 9.9.4.11 | O | TLV | 3-253 |
|  | ESM cause | ESM cause 9.9.4.4 | O | V | 1 or 2 |

Note that the MODIFY EPS BEARER CONTEXT REQUEST message includes an ESM cause as an IE. In some implementations, the LTE network 500 shall include this IE, if the wireless device 510 has reached the PLMN's maximum number of active bearers in S1 mode. The purpose of the ESM cause information element is to indicate the reason why a session management request is rejected or, if the request is accepted, to indicate a limitation.

The present disclosure provides an ESM cause information element that may be included in an activate default EPS bearer context request message, an activate dedicated EPS bearer context request message, or a modify EPS bearer context request message. In some implementations, the ESM cause information element can be coded as #65 "maximum number of EPS bearers reached". Such value is represented by octet 01000001. However, note that the precise value is implementation-specific. In some implementations, the ESM cause information element can be coded in other ways to indicate other information. In a specific example, the ESM cause information element can be coded as #67 "maximum number of default EPS bearers reached", or as #68 "maximum number of dedicated EPS bearers reached". This is shown in Table 3 below.

TABLE 3

ESM cause information element
Cause value (octet 2)

| Bits | | | | | | | | |
|---|---|---|---|---|---|---|---|---|
| 8 | 7 | 6 | 5 | 4 | 3 | 2 | 1 | |
| | | | | | | | | [ . . . ] |
| 0 | 1 | 0 | 0 | 0 | 0 | 0 | 1 | Maximum number of EPS bearers reached |
| 0 | 1 | 0 | 0 | 0 | 0 | 1 | 0 | Requested APN not supported in current RAT and PLMN combination |
| 0 | 1 | 0 | 0 | 0 | 0 | 1 | 1 | Maximum number of default EPS bearers reached |
| 0 | 1 | 0 | 0 | 0 | 1 | 0 | 0 | Maximum number of dedicated EPS bearers reached |
| | | | | | | | | [ . . . ] |

Any other value received by the UE shall be treated as 0010 0010, "service option temporarily out of order". Any other value received by the network shall be treated as 0110 1111, "protocol error, unspecified".
NOTE 1:
The listed cause values are defined in annex B.
NOTE 2:
This value was allocated in earlier versions of this protocol, but there is no situation where this value can be used. If received by the network, it shall be treated as 0110 1111, "protocol error, unspecified".

According to such implementations, it is possible to determine a maximum number of active dedicated contexts or active default contexts upon receiving a cause code in a message indicating an (E)SM procedure was accepted by the LTE network 500.

Example GPRS Implementation Details

Figure 7:
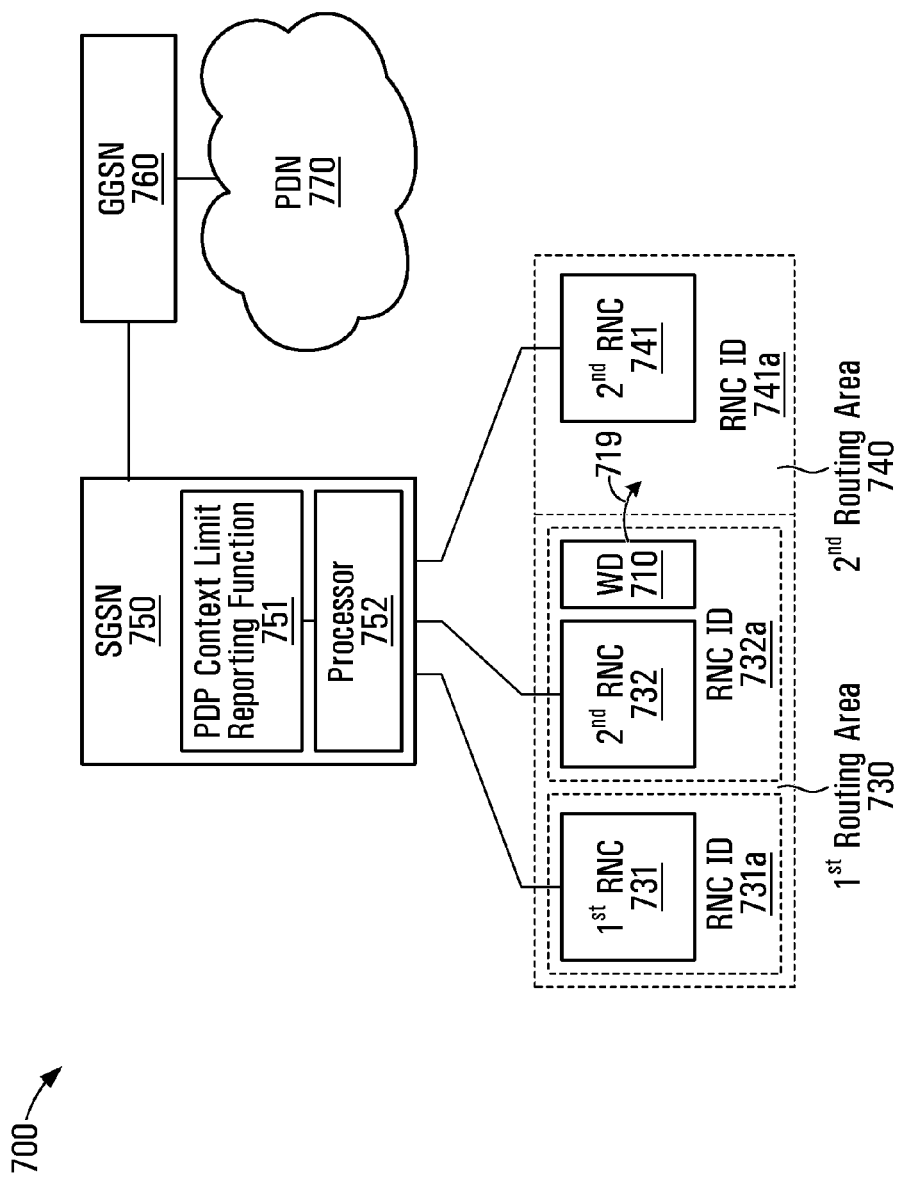
FIG. 7 is a block diagram of an example GPRS (General Packet Radio Service) network.

Referring now to FIG. 7, shown is a block diagram of an example GPRS network 700. In the illustrated example, the GPRS network 700 is shown to have a radio access network based on UMTS (Universal Mobile Telecommunications System). However, other radio access technologies such as GSM can be employed.

The radio access network has a first routing area 730, a second routing area 740, and may have other routing areas that are not shown. Each routing area has at least one RNC (Radio Network Controller). In the illustrated example, the first routing area 730 has a first RNC 731 and a second RNC 732 while the second routing area 740 has a single RNC 741.

Each RNC 731,732,741 is associated with a respective RNC Id. The first RNC 731 and the second RNC 732 of the first routing area 730 have an RNC Id 731*a* and an RNC Id 732*a*, respectively, while the single RNC 741 of the second routing area 740 has an RNC Id 741*a*. Each cell (not shown) within an RNC (via a Node B) is associated with an RAI (Routing Area Identification) in a hierarchal fashion. An RAI may include one or more cells and span across RNCs. In some implementations, each RAI is a combination of a country code, a network code, and a routing area code. RAIs may differ for other wireless networks.

In the illustrated example, each RNC 731,732,741 is coupled to an SGSN 750, which in turn is coupled to a GGSN (Gateway GPRS Support Node) 760. The SGSN 750 and the GGSN 760 form part of a PS (Packet Switched) network for GPRS. The GGSN 760 of the PS network is coupled to a PDN 770, which might for example be an Internet. The SGSN 750 has an context limit reporting function 751 coupled to a processor 752 and may have other components, but they are not shown for simplicity.

The wireless system has a wireless device 710 and may have other wireless devices that are not shown. While details of the wireless device 710 are not shown, the wireless device 710 can be configured in a similar manner as the wireless device 110 shown in FIG. 1. The wireless device 710 is currently positioned within the first routing area 731. However, the wireless device 710 may move to another routing area such as the second routing area 740 as indicated by a moving arrow 719.

In operation, the wireless device 710 is adapted to communicate with the GPRS network 700. Such communication may for example be voice communication, electronic messaging, or any other appropriate form of communication. At least some communication with the GPRS network 700 is over one or more PDP contexts between the wireless device 710 and the GGSN 760. There may be many PDP contexts between the wireless device 710 and the GGSN 760.

The number of PDP contexts that can be supported for the wireless device 710 is limited by various factors. For example, different routing areas may support a different number of PDP contexts per wireless device. In the illustrated example, the PDP context limit reporting function 751 of the SGSN 750 operates to determine the maximum number of PDP contexts that can be supported for the wireless device 710. This might for example involve determining a limit on how many PDP contexts per wireless device can be supported in the routing area 730 in which the wireless device 710 resides.

If a wireless device does not know how many PDP contexts can be supported, then the wireless device might attempt to establish more PDP contexts than are supported. Such attempt would normally be rejected. However, the signalling involved in the attempt to establish another data context and the rejection of that attempt is considered wasteful. Embodiments of the present disclosure allow such waste to be reduced or avoided by signalling to the wireless device when the maximum number of PDP contexts is reached. Such signalling occurs before any attempt to establish more PDP contexts than are supported. Thus, wasteful signaling involved with attempting to establish more PDP contexts can be avoided.

According to an embodiment of the present disclosure, if establishing a PDP context for the wireless device 710 would reach the maximum number of data contexts, the PDP context limit reporting function 751 of the SGSN 750 operates to send a session management information element coded to indicate that the maximum number of PDP contexts is reached. According to another embodiment of the present disclosure, the wireless device 710 operates to receive the session management information element if establishing the PDP context would reach the maximum number of PDP contexts that can be supported for the wireless device 710, and subsequently avoids sending a request for a further PDP context while the maximum number of PDP contexts is established.

There are many possibilities for the PDP context limit reporting function 751 of the GPRS network 700. In the illustrated example, the PDP context limit reporting function 751 is implemented as software and is executed by the processor 752. However, more generally, the PDP context limit reporting function 751 may be implemented as software, hardware, firmware, or any appropriate combination thereof. In the illustrated example, the PDP context limit reporting function 751 is shown as a single component of the SGSN 750. However, more generally, the PDP context limit reporting function 751 may be implemented as one or more components and may be implemented as part of, or separate from, the SGSN 750. The one or more components may be distributed throughout the GPRS network 700, or reside in a common location. Other implementations are possible.

Further example GPRS implementation details will now be provided. It is to be understood that the details provided in this section are very specific and are provided only as examples. Session management procedures are described in 3GPP TS 24.008 under section 6.1.3. An excerpt from section 6.1.3 is reproduced below.

6.1.3 Session Management Procedures
6.1.3.0 General
The MS's maximum number of active PDP contexts in a PLMN is determined by the lowest of the maximum number of Network Service Access Point Identifiers (NSAPIs) allowed by the protocol (as specified in subclause 10.5.6.2), the PLMN's maximum number in Iu or A/Gb mode and the MS's implementation-specific maximum number.
NOTE: Subclauses 6.1.3.1.3 and 6.1.3.2.2 specify how the MS determines the PLMN's maximum number in Iu or A/Gb mode.
6.1.3.1 PDP Context Activation
The purpose of this procedure is to establish a PDP context between the MS and the network for a specific QoS on a specific NSAPI. The PDP context activation may be initiated by the MS or the initiation may be requested by the network.
[ . . . ]
If the MS has reached the maximum number of active PDP contexts (see subclause 6.1.3.0) and the upper layers of the MS request activation of additional PDP context, then the MS shall not send an ACTIVATE PDP CONTEXT REQUEST message or an ACTIVATE SECONDARY PDP CONTEXT REQUEST message to activate the additional PDP context. If the additional PDP context is a PDP context with type set to "emergency", then it may skip explicit deactivation to free PDP context resources and instead re-activate the necessary context(s) relying on network handling of abnormal cases as specified in subclause 6.1.3.1.5 case c). In either case it is an MS implementation option which PDP context(s) to re-use for emergency.
[ . . . ]
On receipt of the ACTIVATE PDP CONTEXT REQUEST message sent by the MS, the network when allocating an IP address shall take into account the PDP type number, the operator policies of the home and visited network, and the user's subscription data.
If the MS requests PDP type IPv4v6, but the network configuration dictates the use of IPv4 addressing only or IPv6 addressing only for this APN, the network shall override the PDP type requested by the MS to a single address PDP type (IPv4 or IPv6). In the ACTIVATE PDP CONTEXT ACCEPT message sent to the MS, the network sets the PDP type number to either "IPv4 address" or "IPv6 address" and the SM cause to #50, "PDP type IPv4 only allowed", or #51, "PDP type IPv6 only allowed", respectively (see subclause 6.1.3.1.1). The MS shall not subsequently request another PDP context to get a PDP Type different from the one allowed by the network.
If the MS requests PDP type IPv4v6, but the operator uses single addressing per PDP context due to interworking with nodes of earlier releases, the network shall override the PDP type requested by setting the PDP type in the ACTIVATE PDP CONTEXT ACCEPT message sent to the MS to a single address PDP type. In the ACTIVATE PDP CONTEXT ACCEPT message sent to the MS, the network sets the PDP type number to either "IPv4 address" or "IPv6 address" and the SM cause to #52, "single address bearers only allowed" (see subclause 6.1.3.1.1). The MS should subsequently request another PDP context for the other PDP type to the same APN with a single address PDP type (IPv4 or IPv6) other than the one already activated.
NOTE 1: If the MT and TE are separated, the MS might not be able to use SM cause #52 "single address bearers only allowed" as a trigger for activating a second single-IP-stack PDP context.
In accordance with another implementation of the present disclosure, if the request to establish a PDP context is accepted without a restriction of IP version, but only one NSAPI is available for the wireless device 710 and PLMN's maximum number of PDP contexts in Iu or A/Gb mode configured at the SGSN 750 for the wireless device 710 is less than the maximum number of NSAPIs allowed by the protocol, then the SGSN 750 shall include SM cause #65 "maximum number of PDP contexts reached" in the ACTIVATE PDP CONTEXT ACCEPT message.

An excerpt from section 6.1.3 concerning a successful PDP context activation initiated by the mobile station is reproduced below.
6.1.3.1.1 Successful PDP Context Activation Initiated by the Mobile Station
In order to request a PDP context activation, the MS sends an ACTIVATE PDP CONTEXT REQUEST message to the network, enters the state PDP-ACTIVE-PENDING and starts timer T3380. The message contains the selected NSAPI, PDP type number and requested QoS. The MS shall ensure that the selected NSAPI is not currently being used by another Session Management entity in the MS. [ . . . ]
In accordance with another implementation of the present disclosure, if the wireless device 710 receives a message with SM cause value is #65 "maximum number of PDP contexts reached", the wireless device 710 shall determine the PLMN's maximum number of PDP contexts in Iu or A/Gb mode as the number of active PDP contexts it has reflecting the number of PDP context that are active after receiving the ACTIVATE PDP CONTEXT ACCEPT message. In other implementations, the wireless device 710 shall determine the PLMN's maximum number of PDP contexts in Iu or A/Gb mode as one plus the number of active PDP contexts. The PLMN's maximum number in Iu or A/Gb mode applies to the PLMN in which the SM cause #65 "maximum number of PDP contexts reached" is received. Note that in some situations, when attempting to establish multiple PDP contexts, the number of active PDP contexts that the wireless device 710 has when cause #65 is received is not equal to the maximum number of PDP contexts reached in the GPRS network 700.

An excerpt from section 6.1.3 concerning successful PDP context activation requested by the network is reproduced below.

6.1.3.1.2 Successful PDP Context Activation Requested by the Network

In order to request a PDP context activation, the network sends a REQUEST PDP CONTEXT ACTIVATION message to the MS and starts timer T3385. The message contains an offered PDP address. If available, the APN shall be included in the REQUEST PDP CONTEXT ACTIVATION message.

Upon receipt of a REQUEST PDP CONTEXT ACTIVATION message if an APN is indicated in the message and the timer T3396 is running for the APN, the MS shall stop the timer T3396, and then either initiate the PDP context activation procedure as described in the previous subclause or reject the activation request by sending a REQUEST PDP CONTEXT ACTIVATION REJECT message as described in subclause 6.1.3.1.4. If the REQUEST PDP CONTEXT ACTIVATION message did not contain an APN, then the MS shall stop the timer T3396 associated with a message that was sent without an APN. The value of the reject cause IE of the REQUEST PDP CONTEXT ACTIVATION REJECT message shall indicate the reason for rejection, e.g. "insufficient resources to activate another context".

The ACTIVATE PDP CONTEXT REQUEST message sent by the MS in order to initiate the PDP context activation procedure shall contain the PDP address, PDP Type and APN requested by the network in the REQUEST PDP CONTEXT ACTIVATION message.

Upon receipt of the ACTIVATE PDP CONTEXT REQUEST message, the network shall stop timer T3385.

The same procedures then apply as described for MS initiated PDP context activation.

In accordance with another implementation of the present disclosure, if only one NSAPI is available for the wireless device 710 and PLMN's maximum number of PDP contexts in Iu or A/Gb mode configured at the SGSN 750 for the wireless device 710 is less than the maximum number of NSAPIs allowed by the protocol, then the SGSN 750 shall include SM cause #65 "maximum number of PDP contexts reached" in the REQUEST PDP CONTEXT ACTIVATION message. If the wireless device 710 receives a message with SM cause value is #65 "maximum number of PDP contexts reached", the wireless device 710 shall determine the PLMN's maximum number of PDP contexts in Iu or A/Gb mode as one plus the number of active PDP contexts it has. The PLMN's maximum number in Iu or A/Gb mode applies to the PLMN in which the SM cause #65 "maximum number of PDP contexts reached" is received. Note that in some situations, when attempting to establish multiple PDP contexts, the number of active PDP contexts that the wireless device 710 has when cause #65 is received is not equal to the maximum number of PDP contexts reached in the GPRS network 700.

An excerpt from section 6.1.3 concerning a secondary PDP context activation procedure is reproduced below.

6.1.3.2 Secondary PDP Context Activation Procedure

The purpose of this procedure is to establish an additional PDP context between the MS and the network for a specific Traffic Flow Template (TFT) and QoS profile on a specific NSAPI, when one or more PDP contexts has/have already been established for the particular PDP address and APN. [ . . . ]

In accordance with another implementation of the present disclosure, if only one NSAPI is available for the wireless device 710 and PLMN's maximum number of PDP contexts in Iu or A/Gb mode configured at the SGSN 750 for the wireless device 710 is less than the maximum number of NSAPIs allowed by the protocol, then the SGSN 750 shall include SM cause #65 "maximum number of PDP contexts reached" in the ACTIVATE SECONDARY PDP CONTEXT ACCEPT message.

An excerpt from section 6.1.3 concerning a successful secondary PDP context activation procedure initiated by a wireless device is reproduced below.

6.1.3.2.1 Successful Secondary PDP Context Activation Procedure Initiated by the MS In order to request a PDP context activation with the same PDP address and APN as an already active PDP context, the MS shall send an ACTIVATE SECONDARY PDP CONTEXT REQUEST message to the network, enter the state PDP-ACTIVE-PENDING and start timer T3380. The message shall contain the selected NSAPI. The MS shall ensure that the selected NSAPI is not currently being used by another Session Management entity in the MS. [ . . . ]

Upon receipt of an ACTIVATE SECONDARY PDP CONTEXT REQUEST, the network shall validate the message by verifying the TI given in the Linked TI IE to be any of the active PDP context(s). The same GGSN address shall be used by the SGSN as for the already established PDP context(s) for that PDP address. The network shall select a radio priority level based on the QoS negotiated and shall reply with an ACTIVATE SECONDARY PDP CONTEXT ACCEPT message, if the request can be accepted.

Upon receipt of the message ACTIVATE SECONDARY PDP CONTEXT ACCEPT, the MS shall stop timer T3380 and enter the state PDP-ACTIVE. [ . . . ]

In accordance with another implementation of the present disclosure, if the wireless device 710 receives a message with SM cause value is #65 "maximum number of PDP contexts reached", the wireless device 710 shall determine the PLMN's maximum number of PDP contexts in Iu or A/Gb mode as the number of active PDP contexts it has reflecting the number of PDP context that are active after receiving the ACTIVATE SECONDARY PDP CONTEXT ACCEPT message. In other implementations, the wireless device 710 shall determine the PLMN's maximum number of PDP contexts in Iu or A/Gb mode as one plus the number of active PDP contexts. The PLMN's maximum number in Iu or A/Gb mode applies to the PLMN in which the SM cause #65 "maximum number of PDP contexts reached" is received.

The number of active PDP contexts may be the number of currently active PDP contexts. Note that in some situations, when attempting to establish multiple PDP contexts, the number of active PDP contexts that the wireless device 710 has when cause #65 is received is not equal to the maximum number of PDP contexts reached in the GPRS network 700.

An excerpt from section 6.1.3 concerning successful secondary PDP context activation procedure requested by the network is reproduced below.

6.1.3.2.1a Successful Secondary PDP Context Activation Procedure Requested by the Network In order to request a PDP context activation with the same PDP address and APN as an already active PDP context, the network shall send a REQUEST SECONDARY PDP CONTEXT ACTIVATION message to the MS and start timer T3385. The message contains the required QoS, Linked TI, and optionally protocol configuration options and a TFT. [ . . . ]

Upon receipt of a REQUEST SECONDARY PDP CONTEXT ACTIVATION message, the MS shall stop the timer T3396 if it is running for the APN associated with the PDP context and then either initiate the secondary PDP context activation procedure [ . . . ] or shall reject the activation request by sending a REQUEST SECONDARY PDP CONTEXT ACTIVATION REJECT message [ . . . ].

The ACTIVATE SECONDARY PDP CONTEXT REQUEST message sent by the MS in order to initiate the secondary PDP context activation procedure shall contain the QoS and Linked TI required in the REQUEST SECONDARY PDP CONTEXT ACTIVATION message. [ . . . ]

The same procedures then apply as described for MS initiated secondary PDP context activation.

In accordance with another implementation of the present disclosure, if only one NSAPI is available for the wireless device 710 and PLMN's maximum number of PDP contexts in Iu or A/Gb mode configured at the SGSN 750 for the wireless device 710 is less than the maximum number of NSAPIs allowed by the protocol, then the SGSN 750 shall include SM cause #65 "maximum number of PDP contexts reached" in the REQUEST SECONDARY PDP CONTEXT ACTIVATION message. If the wireless device 710 receives a message with SM cause value is #65 "maximum number of PDP contexts reached", the wireless device 710 shall determine the PLMN's maximum number of PDP contexts in Iu or A/Gb mode as one plus the number of active PDP contexts it has. The PLMN's maximum number in Iu or A/Gb mode applies to the PLMN in which the SM cause #65 "maximum number of PDP contexts reached" is received. The number of the number of active PDP contexts may be the number of currently active PDP contexts. Note that in some situations, when attempting to establish multiple PDP contexts, the number of active PDP contexts that the wireless device 710 has when cause #65 is received is not equal to the maximum number of PDP contexts reached in the GPRS network 700.

The wireless device 710 may send a MODIFY PDP CONTEXT REQUEST message to the GPRS network 700, in accordance with another implementation of the present disclosure. If only one NSAPI is available for the wireless device 710 and the PLMN's maximum number of PDP contexts configured at the SGSN 750 for the wireless device 710 is less than the maximum number of NSAPIs allowed by the protocol, the SGSN 750 shall include SM cause #65 "maximum number of PDP contexts reached" in a MODIFY PDP CONTEXT ACCEPT message.

The wireless device 710 may receive a MODIFY PDP CONTEXT REQUEST message from the GPRS network 700, in accordance with another implementation of the present disclosure. If only one NSAPI is available for the wireless device 710 and the PLMN's maximum number of PDP contexts configured at the SGSN 750 for the wireless device 710 is less than the maximum number of NSAPIs allowed by the protocol, the SGSN 750 shall include SM cause #65 "maximum number of PDP contexts reached" in the MODIFY PDP CONTEXT REQUEST message, and send the message to the wireless device 710. The wireless device 710 may, in response, send a MODIFY PDP CONTEXT ACCEPT message to the GPRS network 700.

The present disclosure provides an SM cause information element that may be included in a request PDP context activation message, an activate secondary PDP context accept message, or a request secondary PDP context activation message. In some implementations, the SM cause information element can be coded as #65 "maximum number of PDP contexts reached". Such value is represented by octet 01000001. However, note that the precise value is implementation-specific. In some implementations, the SM cause information element can be coded in other ways to indicate other information. In a specific example, the SM cause information element can be coded as #67 "maximum number of primary PDP contexts reached", or as #68 "maximum number of secondary PDP contexts reached". Such encoding maybe similar to the encoding shown in Table 3. Identification of how Many Data Contexts can be Supported Embodiments have been described in which a wireless network transmits to a wireless device a session management information element upon a maximum number of data contexts for the wireless device being established. In such embodiments, the session management information element indicates that the maximum number of data contexts for the wireless device is reached. Therefore, the wireless device can subsequently determine the maximum number of data contexts that can be supported for the wireless device based on the number of data contexts that wireless device has.

Alternatively, or additionally, the wireless network transmits to the wireless device an identification of how many data contexts can be supported for the wireless device. Thus, the wireless device can become aware of the maximum number of data contexts for the wireless device without having to consider the number of data contexts that wireless device has. In some implementations, the identification is transmitted only upon the maximum number of data contexts for the wireless device being established. In alternative implementations, the identification is transmitted in advance of the maximum number of data contexts for the wireless device being established. Other implementations are possible.

In some implementations, when a wireless device receives a message of acceptance in response to a request to activate or establish a data context, and the message includes a value representing the maximum number of data contexts, the wireless device does not send a request to activate or establish another context unless the wireless device has less data contexts active than the maximum number of data contexts. The wireless device can determine that the maximum number of data contexts is equal to the value representing the maximum number of contexts.

In specific implementations, the wireless device determines the maximum number of data contexts upon receiving an Information Element indicating the maximum number of data contexts, where the Information Element is received in a message indicating the (E)SM procedure was accepted by the network. The Information Element can be sent for example in an ACTIVATE DEFAULT EPS BEARER CONTEXT REQUEST message, an ACTIVATE DEDICATED EPS BEARER CONTEXT REQUEST, a MODIFY EPS BEARER CONTEXT REQUEST message, or an ACTIVATE PDP CONTEXT ACCEPT message. An example encoding is provided below in Table 4.

TABLE 4 maximum number of active contexts

| 8 | 7 | 6 | 5 | 4 | 3 | 2 | 1 | |
|---|---|---|---|---|---|---|---|---|
| maximum number of active contexts | | | | — | — | — | — | octet 1 |

| maximum number of active contexts (octet 1) Bits | | | | |
|---|---|---|---|---|
| 8 | 7 | 6 | 5 | |
| 0 | 1 | 0 | 1 | maximum number of active contexts is 1 |
| 0 | 1 | 1 | 0 | maximum number of active contexts is 2 |
| 0 | 1 | 1 | 1 | maximum number of active contexts is 3 |
| 1 | 0 | 0 | 0 | maximum number of active contexts is 4 |
| 1 | 0 | 0 | 1 | maximum number of active contexts is 5 |
| 1 | 0 | 1 | 0 | maximum number of active contexts is 6 |
| 1 | 0 | 1 | 1 | maximum number of active contexts is 7 |
| 1 | 1 | 0 | 0 | maximum number of active contexts is 8 |
| 1 | 1 | 0 | 1 | maximum number of active contexts is 9 |
| 1 | 1 | 1 | 0 | maximum number of active contexts is 10 |
| 1 | 1 | 1 | 1 | maximum number of active contexts is 11 |

The purpose of the information element is to indicate the maximum number of active contexts. Bits 5 to 8 of octet 1 represent the number that is maximum number of active contexts.

This IE can be identical for use in a protocol with messages ACTIVATE (SECONDARY) PDP CONTEXT ACCEPT and ACTIVATE (SECONDARY) PDP CONTEXT REQUEST message.

In some implementations, the value representing the maximum number of contexts may be the value representing any of the following:
 a maximum number of EPS bearer contexts;
 a maximum number of default EPS bearer contexts;
 a maximum number of dedicated EPS bearer contexts;
 a maximum number of dedicated EPS bearer contexts pertaining to a particular default EPS bearer;
 a maximum number of PDP contexts;
 a maximum number of primary PDP contexts;
 a maximum number of secondary PDP contexts;
 a maximum number of secondary PDP contexts pertaining to a particular primary PDP context.

Example Wireless Device

Figure 8:
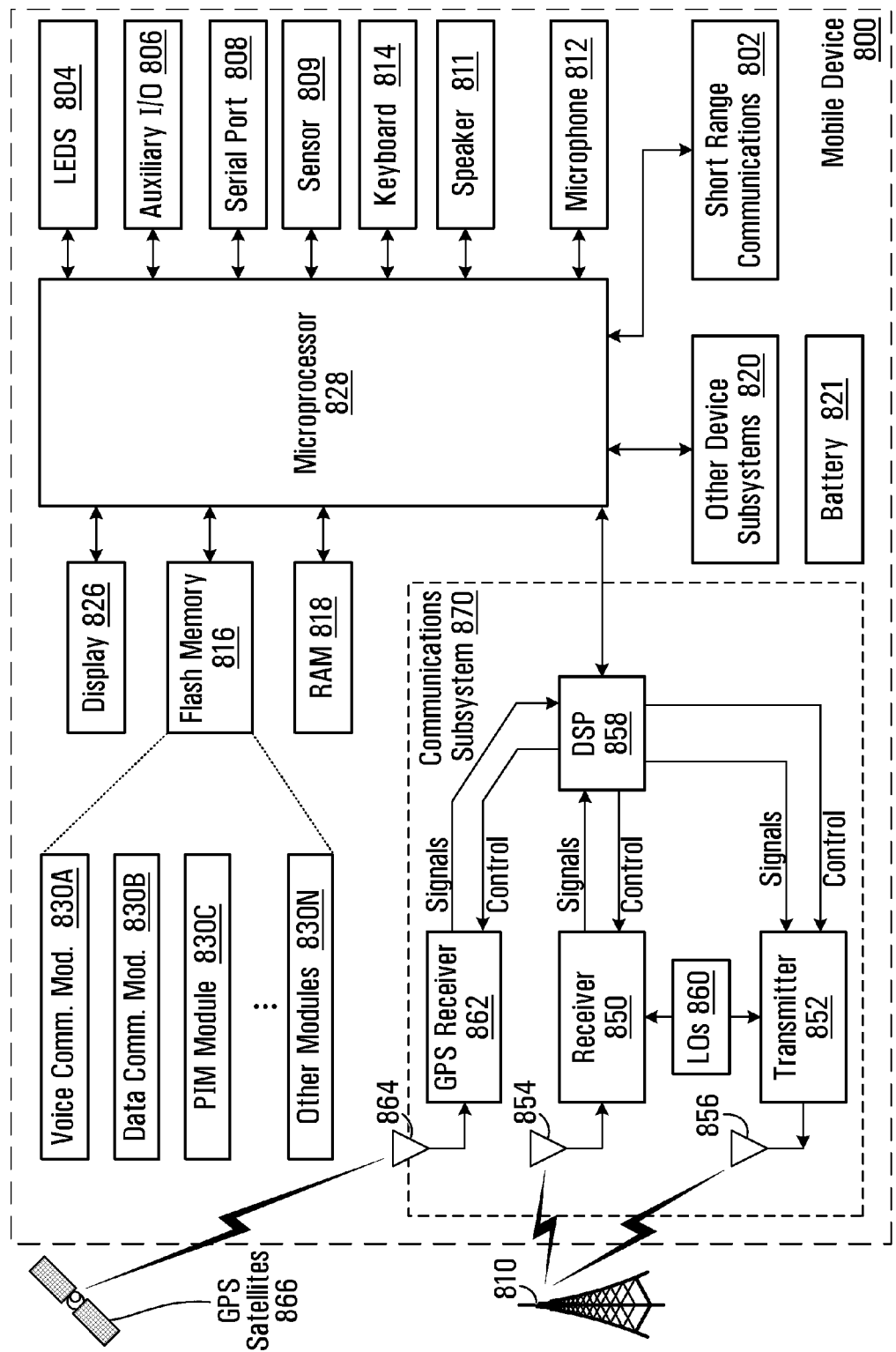
FIG. 8 is a block diagram of an example wireless device.

Referring now to FIG. 8, shown is a block diagram of an example wireless device 800. In this example, the wireless device 800 is a mobile device 800. However, as noted above, other types of wireless devices are possible (e.g. desktop computer, television, enhanced home appliances such as computerized refrigerators and similar devices that have network communications capabilities, etc.) and are within the scope of the disclosure.

The mobile device 800 is shown with specific components for implementing features similar to those of the wireless device 110 shown in FIG. 1, the wireless device 410 shown in FIG. 4, the wireless device 510 shown in FIG. 5, or the mobile device 710 shown in FIG. 7. It is to be understood that the mobile device 800 is shown with very specific details and is provided only as an example.

The mobile device 800 has a housing that may be elongated vertically, or may take on other sizes and shapes (including clamshell housing structures). The keyboard 814 may include a mode selection key, or other hardware or software for switching between text entry and telephony entry. Alternatively, the mobile device 800 may have a housing that does not take on other sizes and shapes.

A microprocessor 828 is shown schematically as coupled between a keyboard 814 and a display 826. The microprocessor 828 is a type of processor with features similar to those of the processor 112 of the wireless device 110 shown in FIG. 1. The microprocessor 828 controls operation of the display 826, as well as overall operation of the mobile device 800, in response to actuation of keys on the keyboard 814 by a user.

In addition to the microprocessor 828, other parts of the mobile device 800 are shown schematically. These include: a communications subsystem 870; a short-range communications subsystem 802; the keyboard 814 and the display 826, along with other input/output devices including a set of LEDs (Light Emitting Diodes) 804, a set of auxiliary I/O (Input/Output) devices 806, a serial port 808, a speaker 811 and a microphone 812; as well as memory devices including a flash memory 816 and RAM (Random Access Memory) 818; and various other device subsystems 820. The mobile device 800 may have a battery 821 to power the active elements of the mobile device 800. The mobile device 800 is in some embodiments a two-way RF (Radio Frequency) communication device having voice and data communication capabilities. In addition, the mobile device 800 in some embodiments has the capability to communicate with other computer systems via the Internet.

Operating system software executed by the microprocessor 828 is in some embodiments stored in a persistent store, such as the flash memory 816, but may be stored in other types of memory devices, such as a ROM (Read Only Memory) or similar storage element. In addition, system software, specific device applications, or parts thereof, may be temporarily loaded into a volatile store, such as the RAM 818. Communication signals received by the mobile device 800 may also be stored to the RAM 818.

The microprocessor 828, in addition to its operating system functions, enables execution of software applications on the mobile device 800. A predetermined set of software applications that control basic device operations, such as a voice communications module 830A and a data communications module 830B, may be installed on the mobile device 800 during manufacture. In addition, a PIM (personal information manager) application module 830C may also be installed on the mobile device 800 during manufacture. The PIM application is in some embodiments capable of organizing and managing data items, such as e-mail, calendar events, voice mails, appointments, and task items. The PIM application is also in some embodiments capable of sending and receiving data items via a wireless network 810. In some embodiments, the data items managed by the PIM application are seamlessly integrated, synchronized and updated via the wireless network 810 with the device users corresponding data items stored or associated with a host computer system. Additional software modules, illustrated as another software module 830N, may be installed during manufacture.

The flash memory 816 stores computer executable instructions for implementing features similar to those of the data context management function 113 of the mobile device 110 shown in FIG. 1. In a specific implementation, the other module 130N of the flash memory 116 stores computer executable instructions that when executed implement a data context manager. Note that the implementations described with reference to FIG. 8 are very specific for exemplary purposes.

Communication functions, including data and voice communications, are performed through the communication subsystem 870, and possibly through the short-range communications subsystem 802. The communication subsystem 870 includes a receiver 850, a transmitter 852, a GPS receiver 862, and one or more antennas, illustrated as a receive antenna 854, a transmit antenna 856, and a GPS antenna 864. In addition, the communication subsystem 870 also includes a processing module, such as a DSP (Digital Signal Processor) 858, and LOs (Local Oscillators) 860. The communication subsystem 870 having the transmitter 852 and the receiver 850 is an implementation of a wireless access radio with features similar to those of the wireless access radio 111 of the mobile device 110 shown in FIG. 1.

The specific design and implementation of the communication subsystem 870 might be dependent upon the communication network in which the mobile device 800 is intended to operate. The communication network might be a cellular network. For example, the communication subsystem 870 of the mobile device 800 may be designed to operate with the Mobitex™, DataTAC™ or GPRS mobile data communication networks and also designed to operate with any of a variety of voice communication networks, such as AMPS (Advanced Mobile Phone Service), TDMA (Time Division Multiple Access), CDMA (Code Division Multiple Access), PCS (Personal Communications Service), GSM, etc. Examples of CDMA include 1× and 1×EV-DO, and Wideband CDMA. Other applicable communication networks might include packet data systems, EDGE, E-EDGE, UMTS/UTRAN, OFDMA systems, TD-SCDMA systems, LTE/E-UTRAN, etc. The communication subsystem 870 may also be designed to operate with a non-cellular network such as an 802.11 Wi-Fi network or an 802.16 WiMAX network or both. Other types of data and voice networks, both separate and integrated, may also be utilized with the mobile device 800.

Network access may vary depending upon the type of communication system. For example, in the Mobitex™ and DataTAC™ networks, mobile devices are registered on the network using a unique PIN (Personal Identification Number) associated with each device. In GPRS networks, however, network access is typically associated with a subscriber or user of a device. A GPRS device therefore typically has a subscriber identity module, commonly referred to as a SIM (Subscriber Identity Module) card, in order to operate on a GPRS network.

When network registration or activation procedures have been completed, the mobile device 800 may send and receive communication signals over the communication network 810. Signals received from the communication network 810 by the receive antenna 854 are routed to the receiver 850, which provides for signal amplification, frequency down conversion, filtering, channel selection, etc., and may also provide analog to digital conversion. Analog-to-digital conversion of the received signal allows the DSP 858 to perform more complex communication functions, such as demodulation and decoding. In a similar manner, signals to be transmitted to the network 810 are processed (e.g., modulated and encoded) by the DSP 858 and are then provided to the transmitter 852 for digital to analog conversion, frequency up conversion, filtering, amplification and transmission to the communication network 810 (or networks) via the transmit antenna 856.

In addition to processing communication signals, the DSP 858 provides for control of the receiver 850, the transmitter 852, and the GPS receiver 862. For example, gains applied to communication signals in the receiver 850 and the transmitter 852 may be adaptively controlled through automatic gain control algorithms implemented in the DSP 858.

In a data communication mode, a received signal, such as a text message or web page download, is processed by the communication subsystem 870 and is input to the microprocessor 828. The received signal is then further processed by the microprocessor 828 for an output to the display 826, or alternatively to some other auxiliary I/O devices 806. A device user may also compose data items, such as e-mail messages, using the keyboard 814 or some other auxiliary I/O device 806, such as a touchpad, a rocker switch, a thumb-wheel, or some other type of input device, or combinations thereof. The composed data items may then be transmitted over the communication network 810 via the communication subsystem 870.

In a voice communication mode, overall operation of the device is substantially similar to the data communication mode, except that received signals are output to a speaker 811, and signals for transmission are generated by a microphone 812. Alternative voice or audio I/O subsystems, such as a voice message recording subsystem, may also be implemented on the mobile device 800. In addition, the display 826 may also be utilized in voice communication mode, for example, to display the identity of a calling party, the duration of a voice call, or other voice call related information.

Location determination using GPS technology involves receiving GPS signals from GPS satellites 866 on the antenna 864. The GPS signals are received using the GPS receiver 862 and processed by the DSP 858. Typically, GPS signals from at least four satellites are processed. Further details of GPS are omitted for simplicity.

The short-range communications subsystem 802 enables communication between the mobile device 800 and other proximate systems or devices, which need not necessarily be similar devices. For example, the short range communications subsystem may include an infrared device and associated circuits and components, an NFC (Near Field Communications™) module, or a Bluetooth™ communication module to provide for communication with similarly-enabled systems and devices.

APPENDIX I

Acronyms

The following is a list of acronyms, many of which appear in the present disclosure.

Acronym Full Text
AMPS Advanced Mobile Phone Service
AN Access Network
BD Blu-Ray Disk
CC Call Control
CD Compact Disk
CDMA Code Division Multiple Access
CN Core Network
DVD Digital Video Disk
ECM EPS Connection Management
EMM EPS Mobility Management
EPC Evolved Packet Core
EPS Evolved Packet System
E-UTRAN Evolved UTRAN
GERAN GSM EDGE Radio Access Network GMM GPRS Mobility Management
HO Handover
IM IP Multimedia
IMS IP Multimedia Subsystem
IP Internet Protocol
LA Location Area
LAI Location Area Identifier
LAU Location Area Update
MM Mobility Management
MME Mobility management Entity
MS Mobile Station
MSC Mobile Switching Centre
NAS Non Access Stratum
NSAPI Network Service Access Point Identifier
PCS Personal Communications Service
PDP Packet Data Protocol
PLMN Public Land Mobile Network
PS Packet Switched
RAN Radio Access Network
RAT Radio Access Technology
RA Routing Area
RAU Routing Area Update
SIM Subscriber Identity Module
SGSN Serving GPRS Support Node
TA Tracking Area
TAU Tracking Area Update
TDMA Time Division Multiple Access
UE User Equipment
UMTS Universal Mobile Telecommunications System
UTRAN Universal Terrestrial Radio Access Network

APPENDIX II

Definitions

The following is a list of definitions for various terms, many of which appear in the present disclosure.

Dedicated bearer: An EPS bearer that is associated with uplink packet filters in the UE and downlink packet filters in the PDN GW where the filters only match certain packets. Definition derived from 3GPP TS 23.401.

Default bearer: An EPS bearer that gets established with every new PDN connection. Its context remains established throughout the lifetime of that PDN connection. A default EPS bearer is a non-GBR (Guaranteed Bit Rate) bearer. Definition derived from 3GPP TS 23.401.

EPS security context: In the present specification, EPS security context is used as a synonym for EPS NAS security context specified in 3GPP TS 33.401.

EPS services: Within the context of this specification, EPS services is used as a synonym for GPRS services in 3GPP TS 24.008.

Evolved packet core network: The successor to the 3GPP Release 7 packet-switched core network, developed by 3GPP within the framework of the 3GPP System Architecture Evolution (SAE).

Evolved packet system: The evolved packet system (EPS) or evolved 3GPP packet-switched domain consists of the evolved packet core network and the evolved universal terrestrial radio access network. Definition derived from 3GPP TS 23.401.

APPENDIX III

Clauses

Additional aspects of the present disclosure are described in the following clauses. It is to be understood that these clauses are very specific and are provided only as examples.

clause 1. A method in a mobile device comprising:
  maintaining at least one condition for transmitting a request for activating a data context, the one condition comprising detecting if the maximum number of data contexts for the mobile device in a network area has been reached;
  receiving a first message from a network node, the first message indicating at least one of a data context activation acceptance, a data context modification request and a data context activation request, the first message further including a session management (SM) information element coded to indicate that the maximum number of data contexts has been reached;
  determining, responsive to the SM information element, the maximum number of data contexts for the mobile device in a network area;
  transmitting, a second message, the second message indicating at least one of a data context activation acceptance, a data context activation reject, a data context modification acceptance and a data context activation request,
  avoiding transmitting a third message, the third message indicating a data context activation request, if any of the at least one condition is satisfied.

clause 2. A method in a mobile device comprising:
  maintaining at least one condition for transmitting a request for activating a data context, the one condition comprising detecting if the maximum number of data contexts for the mobile device in a network area has been reached;
  receiving a first message from a network node, the first message indicating at least one of a data context activation acceptance, a data context modification request and a data context activation request, the first message further including a session management (SM) information element coded to indicate that the maximum number of data contexts has been reached;
  determining, responsive to the SM information element, the maximum number of data contexts for the mobile device in a network area;
  transmitting, a second message, the second message indicating at least one of a data context activation acceptance, a data context activation reject and a data context activation request,
  deactivating a data context followed by transmitting a third message, the third message indicating a data context activation request, if any of the at least one condition is satisfied.

clause 3. The method of clause 1 or clause 2, wherein the any of the at least one condition comprises the upper layers of the mobile device requesting activation of data context activation.

clause 4. The method of clause 1 or clause 2, wherein the message associated with activation of a data context comprises a network initiated request message for activation of the data context.

clause 5. The method of clause 1 or clause 2 wherein the maximum number of data contexts for the mobile device in the network area is applicable in one of a A/Gb mode, a Iu mode, and a S1 mode.

clause 6. The method of clause 1 or clause 2 wherein the method in a mobile device is a method for a SM procedure in a mobile device clause 7. The method of clause 1 or clause 2 wherein SM is Extended SM.

clause 8. The method of clause 1 wherein the request for activating a data context is a request for activating a data context to a data network providing non-emergency bearer services.

clause 9. The method of clause 1 wherein the request for activating a data context is substantially free of a type information element indicating emergency.

clause 10. The method of clause 2 wherein the at least one condition for transmitting a request for activating a data context further comprises detecting if the request for activating a data context is a request for activating a data context to a data network providing emergency bearer services.

clause 11. The method of clause 1 wherein the at least one condition for transmitting a request for activating a data context further comprises detecting if the request for activating a data context is not a request for activating a data context to a data network providing emergency bearer services.

clause 12. A method in a device suited for wireless communication, the method comprising:
 operating in a network area of a network, wherein said operating comprises utilizing one or more data contexts, the one or more data contexts limited to a maximum number of data contexts for the device in a network area;
 receiving a session management information element coded to indicate that the maximum number of data contexts is reached while attempting to establish a first data context for the device, wherein the first data context, if established, causes the device to utilize the maximum number of data contexts in the network area; and
 upon establishing the first data context, refraining from establishing a second data context in the network area.

Numerous modifications and variations of the present disclosure are possible in light of the above teachings. It is therefore to be understood that within the scope of the appended claims, the disclosure may be practised otherwise than as specifically described herein.

We claim:

1. A method by a wireless device, the method comprising:
 sending from the wireless device a first request for establishing a requested data context;
 receiving at the wireless device a session management information element coded to indicate acceptance of the request and that the maximum number of data contexts that can be supported for the wireless device is reached if establishing the requested data context would reach the maximum number of data contexts; and
 in response to receiving the session management information element, avoiding sending from the wireless device a second request for a further data context while a number of established data contexts is the maximum number of data contexts;
 wherein the session management information element is coded to indicate that the maximum number of data contexts that can be supported for the wireless device is reached by including in the session management information element an (E)SM cause information element represented by an octet.

2. The method of claim 1, further comprising:
 after receiving the session management information element, determining the maximum number of data contexts based on the number of established data contexts that the wireless device has.

3. The method of claim 2, wherein determining the maximum number of data contexts based on the number of established data contexts that the wireless device has comprises:
 determining the maximum number of data contexts as one plus the number of established data contexts that the wireless device has.

4. The method of claim 2, wherein determining the maximum number of data contexts based on the number of data contexts that the wireless device has comprises:
 determining the maximum number of data contexts as the number of established data contexts that the wireless device has.

5. The method of claim 4, further comprising:
 waiting a predefined period of time before determining the maximum number of data contexts.

6. The method of claim 1, wherein the wireless device is a mobile device residing in a network area, the method comprising:
 avoiding sending a request for a further data context while the number of established data contexts in the network area is the maximum number of data contexts.

7. The method of claim 1, further comprising:
 after an existing data context is deactivated, sending a request for a further data context if the number of established data contexts is less than the maximum number of data contexts.

8. The method of claim 1, wherein avoiding sending a request for a further data context while the maximum number of data contexts is established comprises:
 detecting whether the further data context is a context for "emergency"; and
 re-activate an existing data context if the further data context is a context for "emergency".

9. The method of claim 1, wherein:
 the wireless device resides in a network area; and
 the maximum number of data contexts that can be supported for the wireless device in the network area is applicable in at least one of A/Gb mode, Iu mode, and S1 mode.

10. The method of claim 1, wherein receiving the session management information element comprises:
 receiving the session management information element during a session management procedure for establishing the data context.

11. The method of claim 1, wherein receiving the session management information element comprises:
 receiving the session management information element only when there are no restrictions of IP (Internet Protocol) version.

12. The method of claim 1, wherein receiving the session management information element comprises:
 receiving the session management information element in a message that requests activation of the data context.

13. The method of claim 1, wherein receiving the session management information element comprises:
 receiving the session management information element in a message that indicates acceptance of a previously sent request message to activate the data context.

14. The method of claim 1, wherein receiving the session management information element comprises:
 receiving the session management information element in a message that requests modification of an existing data context.

15. The method of claim 1, wherein receiving the session management information element comprises:

receiving the session management information element in a message that indicates acceptance of a previously sent request message to modify an existing data context.

16. The method of claim 1, wherein receiving the session management information element comprises at least one of:
receiving the session management information element in an activate default EPS (Evolved Packet System) bearer context request message;
receiving the session management information element in an activate dedicated EPS bearer context request message; and
receiving the session management information element in a modify EPS bearer context request message.

17. The method of claim 1, wherein receiving the session management information element comprises at least one of:
receiving the session management information element in an activate PDP (Packet Data Protocol) context accept message;
receiving the session management information element in a request PDP context activation message;
receiving the session management information element in an activate secondary PDP context accept message;
receiving the session management information element in a request secondary PDP context activation message;
receiving the session management information element in modify PDP context accept message; and
receiving the session management information element in modify PDP context request message.

18. The method of claim 1, wherein receiving the session management information element comprises receiving an extended session management information element.

19. A non-transitory computer readable medium having stored thereon computer executable instructions that when executed by a processor of a wireless device implement the method of claim 1.

20. A wireless device comprising:
a processor; and
a non-transitory computer-readable storage medium coupled to the processor and storing programming instructions for a data context management function, the programming instructions instruct the processor to:
send from the wireless device a first request for establishing a requested data context;
receive a session management information element coded to indicate acceptance of the request and that the maximum number of data contexts that can be supported for the wireless device is reached if establishing the data context would reach the maximum number of data contexts; and
in response to receiving the session management information element, avoid sending a second request for a further data context while a number of established data contexts is the maximum number of data contexts;
wherein the session management information element is coded to indicate that the maximum number of data contexts that can be supported for the wireless device is reached by including in the session management information element an (E)SM cause information element represented by an octet.

21. The wireless device of claim 20, wherein the programming instructions further instruct the processor to:
after receiving the session management information element, determine the maximum number of data contexts based on the number of established data contexts that the wireless device has.

22. The wireless device of claim 20, wherein the programming instructions further instruct the processor to:
receive the session management information element during a session management procedure for establishing the data context.

23. The wireless device of claim 20, wherein the programming instructions further instruct the processor to:
receive the session management information element only when there are no restrictions of IP (Internet Protocol) version.

24. A method in a wireless network, the method comprising:
receiving from a wireless device a request for establishing a requested data context;
determining whether establishing the requested data context for the wireless device would reach a maximum number of data contexts that can be supported for the wireless device; and
in response to determining that establishing the requested data context for the wireless device would reach the maximum number of data contexts that can be supported for the wireless device, sending to the wireless device, a session management information element coded to indicate acceptance of the request and that the maximum number of data contexts that can be supported for the wireless device is reached;
wherein the session management information element is coded to indicate that the maximum number of data contexts that can be supported for the wireless device is reached by including in the session management information element an (E)SM cause information element represented by an octet.

25. The method of claim 24, wherein determining whether establishing a data context for the wireless device would reach the maximum number of data contexts that can be supported for the wireless device comprises:
determining how many data contexts are established for the wireless device; and
determining, based on how many data contexts are established for the wireless device, whether establishing one more data context would reach the maximum number of data contexts that can be supported for the wireless device.

26. The method of claim 24, wherein determining whether establishing a data context for the wireless device would reach the maximum number of data contexts that can be supported for the wireless device comprises:
determining whether only one communication identifier is available for a data context usable by the wireless device and the maximum number of data contexts that can be supported for the wireless device is less than a maximum number of communication identifiers that are supported by a protocol used between the wireless device and the wireless network.

27. The method of claim 24, wherein
the wireless device resides in a network area; and
the maximum number of data contexts that can be supported for the wireless device in the network area is applicable in at least one of A/Gb mode, Iu mode, and S1 mode.

28. The method of claim 24, wherein sending the session management information element comprises:
sending the session management information element during a session management procedure for establishing the data context.

29. The method of claim 24, wherein sending the session management information element comprises:

sending the session management information element only when there are no restrictions of IP (Internet Protocol) version.

30. The method of claim 24, wherein sending the session management information element comprises:
sending the session management information element in a message that requests activation of the data context.

31. The method of claim 24, wherein sending the session management information element comprises:
sending the session management information element in a message that indicates acceptance of a previously sent request message to activate the data context.

32. The method of claim 24, wherein sending the session management information element comprises:
sending the session management information element in a message that requests modification of an existing data context.

33. The method of claim 24, wherein sending the session management information element comprises:
sending the session management information element in a message that indicates acceptance of a previously sent request message to modify an existing data context.

34. The method of claim 24, wherein sending the session management information element comprises at least one of:
sending the session management information element in an activate default EPS (Evolved Packet System) bearer context request message;
sending the session management information element in an activate dedicated EPS bearer context request message; and
sending the session management information element in a modify EPS bearer context request message.

35. The method of claim 24, wherein sending the session management information element comprises at least one of:
sending the session management information element in an activate PDP (Packet Data Protocol) context accept message;
sending the session management information element in a request PDP context activation message;
sending the session management information element in an activate secondary PDP context accept message;
sending the session management information element in a request secondary PDP context activation message;
sending the session management information element in modify PDP context accept message; and
sending the session management information element in modify PDP context request message.

36. The method of claim 24, wherein sending the session management information element comprises sending an extended session management information element.

37. A non-transitory computer readable medium having stored thereon computer executable instructions that when executed by a processor of a wireless network implement the method of claim 24.

38. The method of claim 24, wherein the programming instructions further instruct the processor to:
send the session management information element only when there are no restrictions of IP (Internet Protocol) version.

39. A network node of a wireless network, the network node comprising:
a processor; and
a non-transitory computer-readable storage medium coupled to the processor and storing programming instructions for a data context limit reporting function, the programming instructions instruct the processor to:
receive from a wireless device a request for establishing a requested data context;
determine whether establishing the requested data context for the wireless device would reach a maximum number of data contexts that can be supported for the wireless device; and
in response to determining that establishing the requested data context for the wireless device would reach the maximum number of data contexts that can be supported for the wireless device, send to the wireless device a session management information element coded to indicate acceptance of the request and that the maximum number of data contexts that can be supported for the wireless device is reached;
wherein the session management information element is coded to indicate that the maximum number of data contexts that can be supported for the wireless device is reached by including in the session management information element an (E)SM cause information element represented by an octet.

40. The network node of claim 39, wherein the network node comprises an MME (Mobility Management Entity).

41. The network node of claim 39, wherein the network node comprises an SGSN (Serving General Packet Radio Service Support Node).

42. The network node of claim 39, wherein the programming instructions further instruct the processor to determine whether establishing a data context for the wireless device would reach the maximum number of data contexts that can be supported for the wireless device by:
determining whether only one communication identifier is available for a data context usable by the wireless device and the maximum number of data contexts that can be supported for the wireless device is less than a maximum number of communication identifiers that are supported by a protocol used between the wireless device and the wireless network.

43. The network node of claim 39, wherein the programming instructions further instruct the processor to:
send the session management information element during a session management procedure for establishing the data context.

* * * * *